(12) United States Patent
Yoshida et al.

(10) Patent No.: US 12,389,104 B2
(45) Date of Patent: Aug. 12, 2025

(54) DISPLAY CONTROL THAT DISPLAYS DEGREE OF SUITABILITY AS A FIXED REGION TO BE DISPLAYED ON IMAGES THROUGHOUT A COMPOSITION PROCESS

(71) Applicant: Sony Group Corporation, Tokyo (JP)

(72) Inventors: Keisuke Yoshida, Kanagawa (JP); Yuko Shibaike, Saitama (JP)

(73) Assignee: Sony Group Corporation, Tokyo (JP)

( * ) Notice: Subject to any disclaimer, the term of this patent is extended or adjusted under 35 U.S.C. 154(b) by 111 days.

(21) Appl. No.: 18/263,483

(22) PCT Filed: Aug. 5, 2021

(86) PCT No.: PCT/JP2021/029168
§ 371 (c)(1),
(2) Date: Jul. 28, 2023

(87) PCT Pub. No.: WO2022/195910
PCT Pub. Date: Sep. 22, 2022

(65) Prior Publication Data
US 2024/0314421 A1 Sep. 19, 2024

(30) Foreign Application Priority Data
Mar. 15, 2021 (JP) .................. 2021-041618

(51) Int. Cl.
*H04N 23/62* (2023.01)
*H04N 5/262* (2006.01)

(52) U.S. Cl.
CPC ........... *H04N 23/62* (2023.01); *H04N 5/2624* (2013.01); *H04N 5/2625* (2013.01)

(58) Field of Classification Search
CPC .... H04N 23/62; H04N 5/2624; H04N 5/2625; H04N 23/632; H04N 23/80; H04N 23/81
See application file for complete search history.

(56) References Cited

U.S. PATENT DOCUMENTS

| | | | | |
|---|---|---|---|---|
| 2009/0245684 | A1* | 10/2009 | Makii | H04N 5/2621 382/276 |
| 2010/0026843 | A1* | 2/2010 | Tezuka | H04N 1/215 348/222.1 |
| 2017/0048466 | A1* | 2/2017 | Kawamura | H04N 5/2625 |

FOREIGN PATENT DOCUMENTS

| | | |
|---|---|---|
| JP | 2009232385 A | 10/2009 |
| JP | 2015012481 A | 1/2015 |
| JP | 2017163191 A | 9/2017 |
| WO | 2008129759 A1 | 10/2008 |

OTHER PUBLICATIONS

International Search Report (PCT/ISA/210), International Application No. PCT/JP2021/029168, dated Oct. 26, 2021.

* cited by examiner

*Primary Examiner* — Christopher K Peterson
(74) *Attorney, Agent, or Firm* — Michael Best & Friedrich LLP

(57) ABSTRACT

Provided is a user interface that is suitable for a composition process of multiple pieces of time sequential image data. A control device includes a user interface control section that performs control to simultaneously display some images that are included in an image group including multiple pieces of time sequential image data and that include a top image and a last image. The top image and the last image are at the top and the end in terms of time in a composition range to be subjected to a composition process.

19 Claims, 17 Drawing Sheets

A COMPOSITION PROCESSING EXAMPLE I

B COMPOSITION PROCESSING EXAMPLE II

A COMPOSITION PROCESSING EXAMPLE III

B COMPOSITION PROCESSING EXAMPLE IV

C COMPOSITION PROCESSING EXAMPLE V

A

B

DISPLAY CONTROL THAT DISPLAYS DEGREE OF SUITABILITY AS A FIXED REGION TO BE DISPLAYED ON IMAGES THROUGHOUT A COMPOSITION PROCESS

TECHNICAL FIELD

The present technology relates to a control device, a control method, and a program, and more specifically, relates to a user interface of an image composition process.

BACKGROUND ART

It has been well known to create a variety of images by performing an image composition process of composing multiple images.

PTL 1 discloses a technology of composing an image without requiring skill, to easily provide an image effect of front curtain synchronization/rear curtain synchronization/multi-light emission using a long-time exposure, and also discloses a user interface therefor.

CITATION LIST

Patent Literature

[PTL 1]
Japanese Patent Laid-Open No. 2009-232385

SUMMARY

Technical Problem

To perform a composition process, a user performs an operation of selecting multiple pieces of image data to be subjected to the composition process. If the pieces of image data to be subjected to the composition increase, a user interface screen may become complicated or the visibility or operability of each image may be deteriorated.

Accordingly, an object of the present disclosure is to propose a user interface with which the visibility or operability in an operation for composing images is improved.

Solution to Problem

A control device according to the present technology includes a user interface control section that performs control to simultaneously display some images that are included in an image group including multiple pieces of time sequential image data and that include a top image and a last image. The top image and the last image are at the top and the end in terms of time in a composition range to be subjected to a composition process.

At least the top image and the last image in the composition time range are simultaneously displayed, so that a user is allowed to check the top image and the last image.

In the abovementioned control device according to the present technology, the user interface control section may perform control to display the top image and the last image side by side in one screen without involving screen transition.

The top image and the last image are simultaneously displayed to be compared with each other, without involving screen scrolling, for example.

In the abovementioned control device according to the present technology, the user interface control section may perform control to display a shutter speed for a composite image that is obtained by the composition process for multiple images included in the composition range of the top image to the last image.

Since the time sequential images are composed, the shutter speed for the composite image is different from that for each image included in the composition range. The shutter speed is displayed.

In the abovementioned control device according to the present technology, the user interface control section may change setting of the top image or the last image according to an operation of changing the top image or the last image.

This allows the user to optionally select either one of or both the top image and the last image.

In the abovementioned control device according to the present technology, the user interface control section may display a time axis for the image group, and further, may regard an operation performed on the indicated time axis, as an operation of changing the top image or the last image.

For example, a slide bar that represents the time axis for the image group is displayed to be operated by the user.

In the abovementioned control device according to the present technology, the user interface control section may change an image to be displayed as the top image or the last image according to an operation.

The top image and the last image are switched by a reproduction operation or a frame-by-frame advance operation, for example.

In the abovementioned control device according to the present technology, the user interface control section may set the top image or the last image according to a shutter speed input operation.

The user interface screen to which, for example, a shutter speed can be inputted is provided.

In the abovementioned control device according to the present technology, the user interface control section may perform control to display, on the displayed top image or last image, a fixed region in which an in-frame position is to be fixed throughout the images during the composition process.

When the multiple images are composed, a specific subject region in a captured image is determined as a fixed region. The in-frame position (pixel position) of the fixed region is fixed in the same pixel position throughout the images to be composed.

In the abovementioned control device according to the present technology, the user interface control section may perform a process of setting a fixed region in a frame of the top image or the last image according to an operation of designating the fixed region in which an in-frame position is to be fixed throughout the images during the composition process.

That is, a specific subject region in a captured image can be set as a fixed region according to a user operation.

In the abovementioned control device according to the present technology, the user interface control section may perform control to display, on the displayed top image or last image, a candidate of a fixed region in which an in-frame position is to be fixed throughout the images during the composition process, and may set the fixed region in a frame of the top image or the last image according to a fixed region candidate designation operation.

For example, a fixed region candidate on the image is presented such that the user can designate the candidate.

In the abovementioned control device according to the present technology, the user interface control section may perform control to display, on the displayed top image or last image, a fixed region candidate or a fixed region in which an in-frame position is to be fixed throughout the images during the composition process, and further, to display the degree of suitability as a fixed region.

For example, the difference in numerical values or display forms is used to present the degrees of suitability of the fixed regions or fixed region candidates to the user.

In the abovementioned control device according to the present technology, the user interface control section may perform user interface control to allow selection of a method of the composition process, and may set a method of the composition process according to a composition process method selection operation.

Examples of the method of the composition process for multiple images include an addition averaging mode, a lightening mode, and a weighting mode. The user interface through which the composition process method can be selected is provided.

In the abovementioned control device according to the present technology, the user interface control section may perform control to display a composite image simultaneously with the top image and the last image.

A composite image that is generated as a result of the composition process of the composition range indicated by the top image and the last image is also displayed in addition to the top image and the last image.

In the abovementioned control device according to the present technology, the user interface control section may perform control to display an operation element for giving a command for performing the composition process, simultaneously with the top image and the last image.

On the screen on which the top image and the last image are displayed, a command for the actual composition process can be given.

In the abovementioned control device according to the present technology, pieces of image data included in the image group may be pieces of image data whose exposure periods at the image capturing time are continuous.

For example, the time sequential image data is a sequence of image data in which no non-exposure period is provided.

In the abovementioned control device according to the present technology, each image data of the image group may be RAW image data.

Image composition is performed on a group of RAW image data obtained by image capturing. That is, the multiple pieces of image data are composed before the development process.

In the abovementioned control device according to the present technology, pieces of image data included the image group may be time sequential image data obtained by continuous capturing of still images or video capturing.

That is, the pieces of image data are pieces of image data of multiple frames which are a sequence of still images obtained by one-time continuous image capturing, or pieces of image data of frames constituting a video obtained by video capturing.

The abovementioned control device according to the present technology may further include a composition processing section that composes multiple images included in the composition range of the top image to the last image set by the user interface control section.

For example, the composition process is performed on a range set through the user interface screen.

A control method according to the present technology includes, by a control device, performing user interface control to simultaneously display some images that are included in an image group including multiple pieces of time sequential image data and that include a top image and a last image, the top image and the last image being at the top and the end in terms of time in a composition range to be subjected to a composition process. This provides a user interface for the composition process.

A program according to the present technology causes a computation processing device to control the above user interface. Accordingly, the abovementioned control device can be implemented.

DESCRIPTION OF EMBODIMENTS

Figure 1:
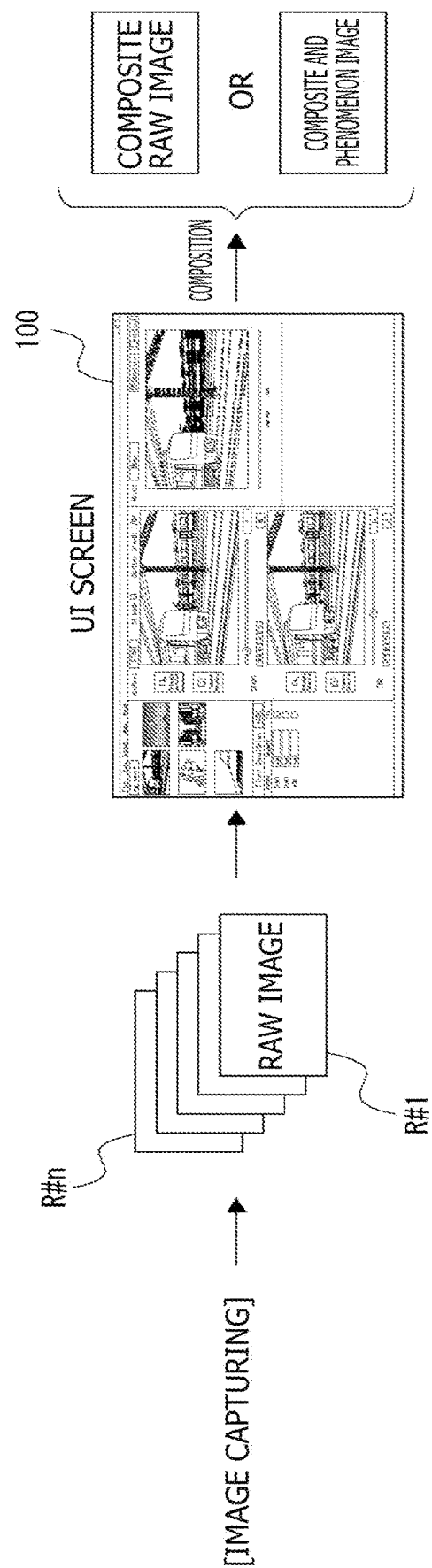
FIG. 1 is an explanatory diagram of a composition process and a user interface according to an embodiment of the present technology.

Hereinafter, embodiments will be explained in the following order.
<1. Outline>
<2. Configuration of image capturing device>
<3. Configuration of information processing device>
<4. Composition process and development process>
<5. UI processing example>
<6. UI control example according to first embodiment>
<7. UI control example according to second embodiment>
<8. Examples of composition mode>
<9. Conclusion and modifications>

It is to be noted that the present disclosure uses the term "composition range" which is related to an image composition process. The "composition range" refers to a time range. In the present disclosure, the term "composition process" refers to a process of composing image data of multiple time sequential frames. In that case, a range of the pieces of image data of the multiple frames to be composed in the composition process is referred to as a composition range. Further, an image of image data that is at the top of the composition range in terms of time is referred to as a "top image," while an image of image data that is at the end of the composition range in terms of time is referred to as a "last image."

The composition range is determined by a user's operation. Alternatively, the composition range may be automatically determined.

Further, the term "image group" refers to pieces of image data of multiple time sequential frames that can be set to be included in a composition range. A whole or a part of the section of the image group is set as the abovementioned "composition range."

In addition, the expression "time sequential" for multiple pieces of image data in the present disclosure may mean to be completely continuous. However, the expression is not limited to this meaning, and the meaning of the expression is so wide that multiple pieces of time sequential image data may be an intermittent sequence of image data as long as the image data has continuity in terms of time. For example, each image data which has multiple frames obtained by continuous capturing of still pictures or general video recording is also regarded as "multiple pieces of time sequential image data." Further, each image data which is multiple still pictures obtained when a user of an image capturing device performs not continuous shooting but single shooting (takes one still picture) several times is also regarded as "multiple pieces of time sequential image data" because the sequence of the frames can be identified.

In short, multiple pieces of image data the time sequence of which is identified correspond to "multiple pieces of time sequential image data."

An example in which RAW images are composed will mainly be explained, but the present invention is not limited to this example. Image data to be composed may be image data of any formats including a JPEG (Joint Photographic Experts Group) format.

A RAW image refers to an image that has not partially or completely undergone a development process in an image capturing device or the like. In addition, image data forming one image (one frame) as a RAW image is referred to as RAW image data.

Specifically, although there are various kinds of image data that are called RAW image data, image data having an array of colors identical to that of an image capturing element (image sensor) is used as an example of RAW image data in the present embodiment. It is to be noted that RAW image data also includes image data that has an array of colors identical to that of an image capturing element as a result of the same failure correction.

For example, in a case where an image sensor outputs R (red), G (green), and B (blue) pixel signals, RAW image data is image data of an R, G, and B format. It is to be noted that RAW image data may also include image data that has a W (white) pixel value in addition to R, G, and B. Moreover, in a case where an image sensor has a Bayer array, image data containing G1 (green 1), G2 (green 2), R (red), and B (blue) pixel values is the RAW image data. Further, in some image data formats, G1, G2, R, and B pixel values are combined as four separate channels. For example, G1, G2, R, and B constitute respective frames, and then, the channels thereof are compressed separately, so that the image data is obtained. In other words, the image data is image data as G1 image data, G2 image data, R image data, and B image data, for example. This is also included in the examples of RAW image data.

In addition, image data that is obtained by converting image data read out from an image capturing element to a format of brightness values and chroma values and that has not undergone color reproduction/sharpness processing is also sometimes called RAW image data. This is one kind of RAW image data in the present disclosure. In order to make a distinction in the explanation, this kind of the RAW image data is referred to as "YC-PAW image data."

1. OUTLINE

A control device according to an embodiment is assumed to be installed as a control section in an image capturing device (camera) or an information processing device that edits images, for example. Alternatively, an image capturing device or an information processing device having this control section installed therein can be regarded as a control device according to the present disclosure.

A control device of such a type performs control to provide a user interface (also expressed as "UI") screen for a composition process of an image group including multiple pieces of time sequential image data.

FIG. 1 schematically depicts a process ranging from input of multiple pieces of RAW image data R #1 to R #n as a result of an image capturing operation to completion of a composition process of the pieces of RAW image data.

It is to be noted that possible composition processes of the present embodiment include a composition process of superimposing multiple pieces of image data by frame position matching and a composition process of superimposing multiple pieces of image data by specific subject position matching.

For example, multiple pieces of RAW image data (R #1 to R #n) are image data which is still pictures taken consecutively by continuous shooting or image data of frames imaged as a video. The multiple pieces of image data constitute a group of images having the relation of time sequential frames.

A control device provides a UI screen 100 to a user who intends to perform a composition process of the multiple pieces of PAW image data (R #1 to R #n).

On the UI screen 100, the user checks images, and sets a composition range by specifying a top image and a last image.

A composition process is performed according to settings performed on the UI screen 100.

Accordingly, composite RAW image data is generated, for example.

One composite RAW image data may be generated from multiple pieces of PAW image data, or multiple pieces of RAW image data that are less in number than multiple pieces of RAW image data may be generated from the multiple pieces of RAW image data.

For example, when ten (ten frames) pieces of time sequential PAW image data are inputted as an image group, pieces of RAW image data to be composed may be selectively used. For example, all the ten pieces of image data are composed to generate RAW image data, or seven of the ten pieces of image data are composed to generate PAW image data.

Moreover, a development process may be performed on composite RAW image data. Accordingly, image data of a predetermined format, such as JPEG, can be obtained, for example. The image data of a predetermined format is of course not limited to JPEG image data. Examples of the predetermined format include HEIF (High Efficiency Image File Format), YUV422, and YUV420.

An explanation of the embodiment given below mainly describes an example in which multiple pieces of time sequential RAW image data are composed to generate composite RAW image data.

For example, multiple pieces of sequentially recorded RAW image data are composed to generate one composite RAW image data. In this case, an effect that is equivalent to a long-time exposure effect can be obtained. In addition, it is assumed that the number of pieces of RAW image data to be composed can be defined, so that composite RAW image data is created at any shutter speed which is different from the shutter speed for image capturing of the RAW image data.

In addition, lens correction, NR (noise reduction), demosaicing, color reproduction, and sharpness processing, for example, can be performed on composite RAW image data obtained as a result of the composition process, as in a normal development process.

2. CONFIGURATION OF IMAGE CAPTURING DEVICE

Figure 2:
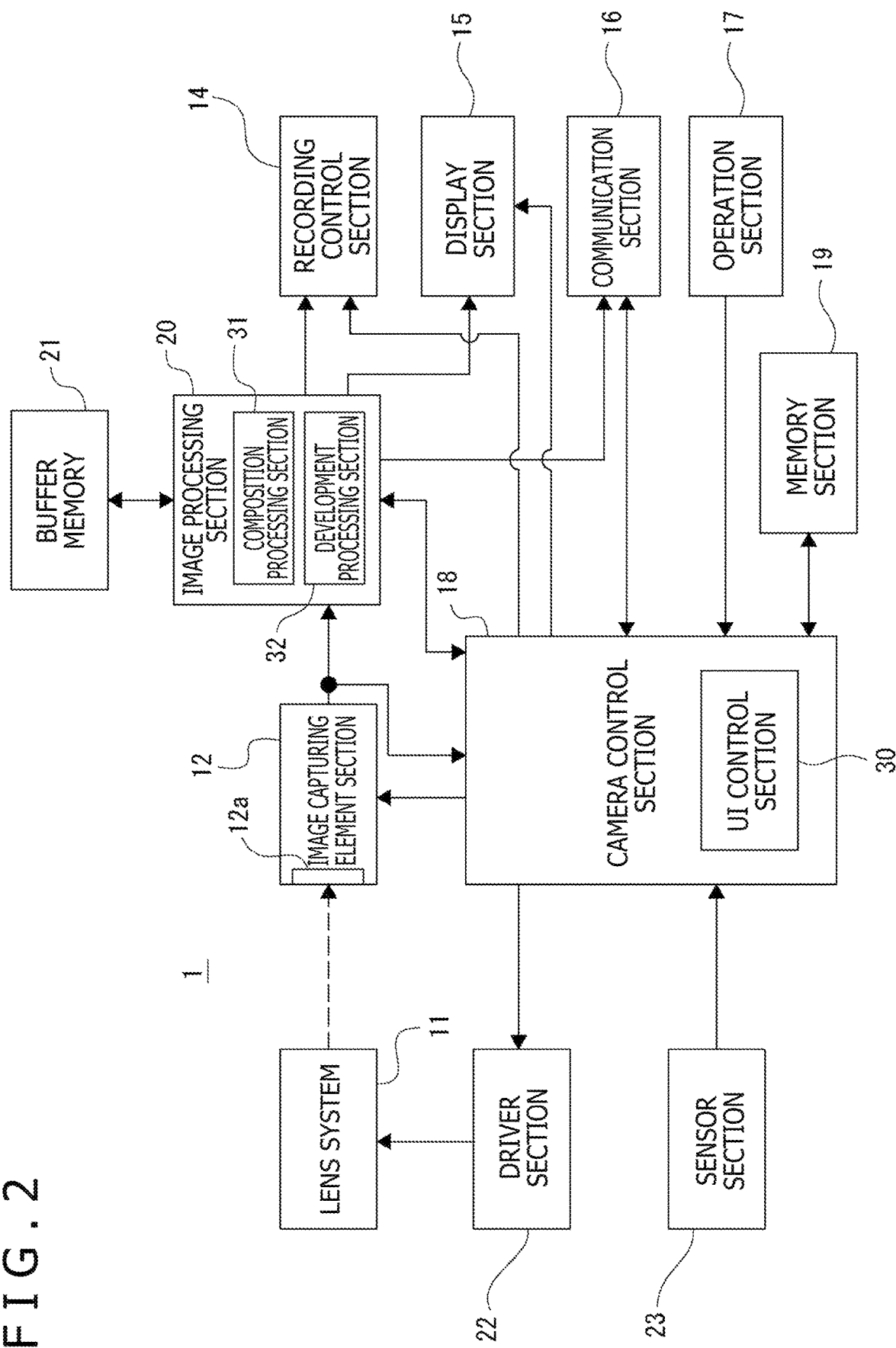
FIG. 2 is a block diagram of an image capturing device according to the embodiment.

A configuration example of an image capturing device 1 will be explained with reference to FIG. 2.

The image capturing device 1 includes a UI control section 30 that performs UI control for image composition. The image capturing device 1 including the UI control section 30 or a processor (camera control section 18) included the UI control section 30 can be regarded as an example of the control device according to the present disclosure.

For example, the image capturing device 1 includes a lens system 11, an image capturing element section 12, a recording control section 14, a display section 15, a communication section 16, an operation section 17, a camera control section 18, a memory section 19, an image processing section 20, a buffer memory 21, a driver section 22, and a sensor section 23.

The lens system 11 includes such a lens as a zoom lens or a focus lens and a diaphragm mechanism, for example. With the lens system 11, light (incident light) from a subject is guided and condensed onto the image capturing element section 12.

The image capturing element section 12 includes an image sensor 12a (image capturing element) of a CMOS (Complementary Metal Oxide Semiconductor) type or a CCD (Charge Coupled Device) type, for example.

The image capturing element section 12 performs, for example, a CDS (Correlated Double Sampling) process or an AGC (Automatic Gain Control) process on an electric signal obtained by photoelectric conversion of light received at the image sensor 12a, and further, performs A/D (Analog/Digital) conversion on the electric signal. Further, the image capturing element section 12 outputs an image capturing signal as digital data to the image processing section 20 and the camera control section 18 on the later stage.

The image processing section 20 is formed as an image processing processor by a DSP (Digital Signal Processor) or the like, for example.

The image processing section 20 performs various kinds of signal processing on the digital signal (image capturing signal), that is, RAW image data, supplied from the image processing section 20.

It is to be noted that, in some cases, RAW image data refers to image data, such as the YC-RAW image data described above, obtained by performing certain processing on the digital signal supplied from the image capturing element section 12. Alternatively, image data which is not YC-RAW image data but is obtained by performing, as preprocessing, a clamping process of clamping the black level of R, G, and B to a predetermined level, or a R, G, and B color channel correction process on the image capturing signal supplied from the image capturing element section 12 may be referred to as RAW image data in some cases.

In other cases, image data on which lens correction or noise reduction has been performed may be referred to as PAW image data.

In the present embodiment, the image processing section 20 has signal processing functions which are implemented by a composition processing section 31 and a development processing section 32.

The composition processing section 31 performs a composition process of generating composite RAW image data by composing multiple pieces of RAW image data which each constitute one frame image, which will be explained later.

It is to be noted that the composition processing section 31 can further perform a composition process on image data developed by the development processing section 32, as will be described below.

The development processing section 32 performs a development process of generating image data of a predetermined format by performing a development process on RAW image data or the composite RAW image data generated by the composition processing section 31. For example, the development processing section 32 performs lens correction, noise reduction, synchronization processing, YC generation processing, color reproduction/sharpness processing, etc.

In the synchronization processing, a color separation process for giving all R, G, and B color components to the image data on each pixel is performed. For example, in a case where an image capturing element has a Bayer array color filter, demosaicing is performed as the color separation process.

In the YC generation processing, a luminance signal (Y) and a color signal (C) are generated (separated) from R, G, and B image data.

In the color reproduction/sharpness processing, a process for adjusting the gradation, the brightness, the tone, the contrast, etc., for what is generally called image processing is performed.

The abovementioned processes in the development processing section 32 are development processes in a broad sense. In particular, the color reproduction/sharpness processing is a development process in a limited sense. From the image data that has undergone the development process in a limited sense, part of information of the original RAW image data has been eliminated. Thus, the degree of freedom in the following image edition is narrow.

Image data that has not undergone the development process in a limited sense is considered to be PAW image data or YC-RAW image data in the present disclosure.

The image processing section 20 generates image data of a predetermined format by performing the development process in a broad sense in the development processing section 32 as described above.

In this case, resolution conversion or a file forming process may be performed. In the file forming process, for example, compression and encoding for recording or for communication, formatting, or meta data generation or addition is performed on image data, whereby a file for recording or for communication is generated.

For example, an image file of a JPEG, TIFF (Tagged Image File Format), GIF (Graphics Interchange Format), HEIF, YUV422, or YUV420 format is generated as a still picture image file. In addition, an image file of an MP4 format which is used for recording an MPEG-4-compliant video/sound may be generated.

It is to be noted that an image file of RAW image data which has not undergone a development process may be generated.

The buffer memory 21 includes a D-RAM (Dynamic Random Access Memory), for example. The buffer memory 21 is used to temporarily save image data during the abovementioned composition process or development process in the image processing section 20.

The recording control section 14 records and reproduces data in a recording medium including a nonvolatile memory, for example. The recording control section 14 performs a process of recording image files such as video data and still picture data into the recording medium, for example.

There are wide variations in actual formats of the recording control section 14. For example, the recording control section 14 may be formed as a flash memory included in the image capturing device 1 and a writing/reading circuit therefor. Alternatively, the recording control section 14 may be a recording medium attachable to/detachable from the image capturing device 1, which is, for example, a card recording and reproduction section that makes recording and reproduction access to a memory card (e.g., portable flash memory). Alternatively, the recording control section 14 that is included in the image capturing device 1 may be implemented as an HDD (Hard Disk Drive).

The display section 15 is a display section that performs various kinds of display to a user. For example, the display section 15 is a view finder or a display panel including a display device such as a liquid crystal panel (LCD: Liquid Crystal Display) or an organic EL (Electro-Luminescence) display disposed on the casing of the image capturing device 1.

The display section 15 performs various kinds of display on a display screen in accordance with a command from the camera control section 18.

For example, the display section 15 displays a reproduced image of the image data read out from the recording medium by the recording control section 14.

In addition, the display section 15 may be supplied with image data of a captured image the resolution of which has been converted for displaying by the image processing section 20, and perform display based on the image data of the captured image in accordance with a command from the camera control section 18. As a result, what is generally called a through image (subject monitoring image) which is a captured image during composition confirmation or move recording, is displayed.

In addition, in accordance with a command from the camera control section 18, the display section 15 displays various operation menus, icons, messages, that is, GUI (Graphical User Interface) display, on a screen.

The communication section 16 performs wired/wireless data communication or network communication with an external device. For example, the communication section 16 transmits and outputs a still picture file or a video file including captured image data or meta data to an external information processing device, display device, recording device, or reproduction device, for example.

In addition, the communication section 16 serves as a network communication section to perform communication using various kinds of networks such as the internet, a home network, or a LAN (Local Area Network) and exchange data with a server or a terminal on the network, for example.

In addition, through the communication section 16, the image capturing device 1 may perform mutual information communication with a PC, a smartphone, or a tablet terminal, through short-distance wireless communication or infrared communication such as Bluetooth (registered trademark), Wi-Fi (registered trademark), or NFC (Near field communication), for example. In addition, the image capturing device 1 may be configured to mutually communicate with another device via wired connection communication.

Accordingly, through the communication section 16, the image capturing device 1 can transmit a captured image or meta data to an information processing device 70 to be described later.

Input devices through which a user performs various operations and inputs are collectively represented by the operation section 17. More specifically, the operation section 17 represents operation elements (e.g., a key, a dial, a touch panel, and a touch pad) that are provided on the casing of the image capturing device 1.

A user operation is detected by the operation section 17, and a signal corresponding to the inputted operation is transmitted to the camera control section 18.

The camera control section 18 includes a microcomputer (computation processing device) including a CPU (Central Processing Unit).

The memory section 19 stores information or the like which is used for a process in the camera control section 18. The memory section 19 depicted in the drawing represents, for example, a ROM (Read Only Memory), a RAM (Random Access Memory), a flash memory, etc., comprehensively.

The memory section 19 may be a memory region in a microcomputer chip that is the camera control section 18, or may include a separate memory chip.

The camera control section 18 controls the image capturing device 1 in whole by executing a program stored in the ROM or flash memory in the memory section 19.

For example, the camera control section 18 controls operations of necessary sections such as control of the shutter speed of the image capturing element section 12, a command for various kinds of signal processing in the image processing section 20, an image capturing operation or recording operation based on a user operation, a reproduction operation of a recorded image file, zooming of a lens body, operations of the lens system 11 such as focusing or diaphragm adjustment, and operation of the user interface.

In the camera control section 18, the function of the UI control section 30 is implemented by software, for example. The UI control section 30 controls the display section 15, an external display device connected with the image capturing device 1, or an external display device that can perform communication with the image capturing device, to display the UI screen 100. Further, the UI control section 30 performs a process of detecting a user operation on the UI screen 100. Through the UI screen 100, a user is allowed to confirm images for a composition process and to perform various kinds of setting operations, which will be explained in detail later.

The UI control section 30 (camera control section 18) controls a composition process in the composition processing section 31 according to the settings for the composition process that is performed through the UI screen 100.

It is to be noted that the function of the abovementioned image processing section 20 may be implemented by software in the camera control section 18.

As a work area for various kinds of data processing in the CPU of the camera control section 18, the RAM in the memory section 19 is used to temporarily store data and a program, etc.

The ROM and the flash memory (nonvolatile memory) in the memory section 19 are used to store an OS (Operation System) for allowing the CPU to control the sections, a content file such as an image file, and further, an application program for various operations, firmware, and various kinds of setting information, etc.

The driver section 22 includes a motor driver for a zoom lens driving motor, a motor driver for driving a focus lens, and a motor driver for a diaphragm mechanism, for example.

These motor drivers are configured to apply a driving current to the corresponding drivers to move the focus lens and the zoom lens and to open/close a diaphragm blade of a diaphragm mechanism in accordance with a command from the camera control section 18.

The sensor section 23 comprehensively represents various sensors installed in the image capturing device.

In a case where, for example, an IMU (inertial measurement unit) is installed as the sensor section 23, angular velocities can be detected by means of an angular velocity (gyro) sensor for three axes, i.e., pitch, yaw, roll, and an acceleration can be detected by means of an acceleration sensor.

Alternatively, for example, a positional information sensor, an illuminance sensor, a ranging sensor, or the like may be installed as the sensor section 23.

Various kinds of information, for example, position information, distance information, illuminance information, and IMU data, detected by the sensor section 23 and time-and-date information being managed by the camera control section 18 are added, as meta data, to a captured image.

3. CONFIGURATION OF INFORMATION PROCESSING DEVICE

Figure 3:
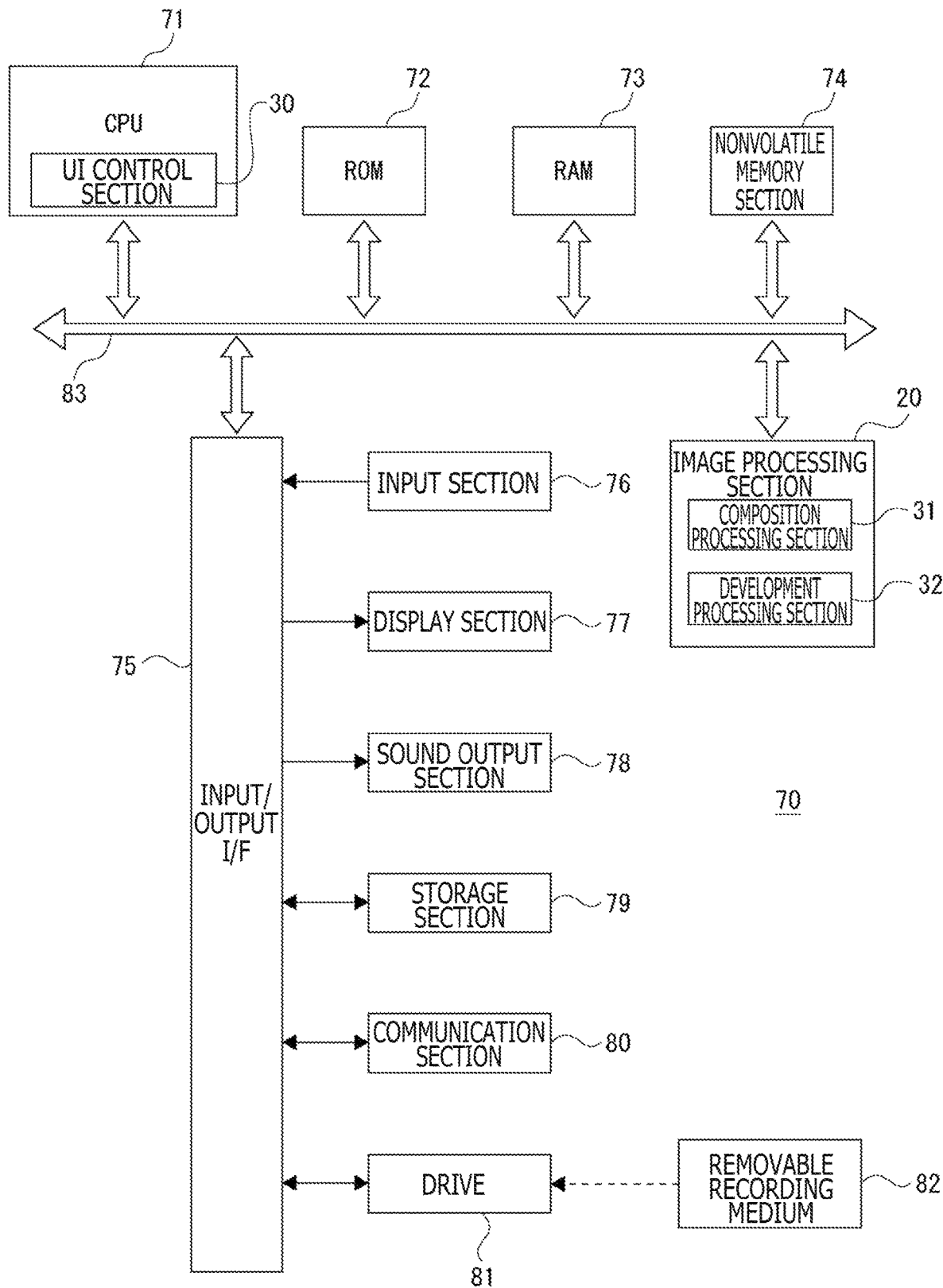
FIG. 3 is a block diagram of an information processing device according to the embodiment.

Next, a configuration example of the information processing device 70 will be explained with reference to FIG. 3.

The information processing device 70 is, for example, a computer device capable of processing information, or particularly, processing images. Specifically, the information processing device 70 is a personal computer (PC), a portable terminal device such as a smartphone or a tablet, a cellular phone, a video editor, or a video reproducing device. Alternatively, the information processing device 70 may be a computer device that is formed as a computation device or a server device in cloud computing.

Further, the information processing device 70 includes the UI control section 30 that performs UI control for a composition process. The information processing device 70 including the UI control section 30 or a processor (CPU 71) including the UI control section 30 can be regarded as an example of a control device according to the present disclosure.

The CPU 71 of the information processing device 70 executes a variety of processes in accordance with a program stored in a ROM 72 or a nonvolatile memory section 74 which is an EEP-ROM (Electrically Erasable Programmable Read-Only Memory), for example, or in accordance with a program loaded from a storage section 79 to a RAM 73. Further, data that is necessary for the CPU 71 to perform various processes is also stored in the RAM 73, as appropriate.

The image processing section 20 have the functions of the composition processing section 31 and the development processing section 32, which have previously been explained in the explanation concerning the image capturing device 1.

The composition processing section 31 and the development processing section 32 in the image processing section 20 may be provided as functions of the CPU 71.

Alternatively, the image processing section 20 may be implemented as a CPU, a GPU (Graphics Processing Unit), GPGPUs (General-purpose computing on graphics processing units), or an AI (artificial intelligence) processor that is separate from the CPU 71.

In the CPU 71, the function of the UI control section 30 is implemented by software, for example. The UI control section 30 controls a display section 77 or an external or remote display device that can communicate with the information processing device 70, to display the UI screen 100. Further, the UI control section 30 performs a process of detecting a user operation on the UI screen 100. Through the UI screen 100, the user is allowed to check images for a composition process and to perform setting operations.

The UI control section 30 (CPU 71) controls a composition process in the composition processing section 31 according to the composition process settings performed through the UI screen 100.

The CPU 71, the ROM 72, the RAM 73, the nonvolatile memory section 74, and the image processing section 20 are mutually connected to each other via a bus 83. An input/output interface 75 is also connected to the bus 83.

An input section 76 that includes an operation element or an operation device is connected to the input/output interface 75. For example, the input section 76 is assumed to be various kinds of operation elements or operation devices such as a keyboard, a mouse, a key, a dial, a touch panel, a touch pad, or a remote controller.

With the input section 76, a user operation is detected, and a signal corresponding to the inputted operation is interpreted by the CPU 71.

A microphone may also be used as the input section 76. A voice uttered by a user may be inputted as operation information.

In addition, a display section 77 that includes an LCD, an organic EL panel, or the like and a sound output section 78 that includes a loudspeaker or the like are connected integrally or separately to the input/output interface 75.

The display section 77 is a display section that performs various kinds of display. For example, the display section 77 includes a display device disposed on a casing of the information processing device 70, or a separate display device connected to the information processing device 70, for example.

The display section 77 performs display of an image to be subjected to various kinds of image processing and a video to be processed, on a display screen in accordance with a command from the CPU 71. In addition, the display section 77 indicates various operation menus, icons, and messages, in accordance with a command from the CPU 71. That is, the display section 77 provides display as a GUI.

In some cases, a storage section 79 that includes an HDD, a solid memory, or the like and a communication section 80 that includes a modem or the like are connected to the input/output interface 75.

The storage section 79 can store data to be processed and various kinds of programs.

In a case where the information processing device 70 functions as a control device according to the present disclosure, image data (e.g., RAW image data) that can be subjected to a composition process, composite RAW image data, and JPEG image data obtained by developing composite RAW image data, etc., can be stored in the storage section 79.

In addition, programs for a UI control process, a composition process, a development process, etc., are stored in the storage section 79.

The communication section 80 performs a communication process through a transmission path such as the internet, and performs communication through wired/wireless communication or bus communication with other devices.

Communication with the image capturing device 1, or more particularly, reception of a captured image, is conducted by the communication section 80.

A drive 81 is also connected to the input/output interface 75, if needed. A removable recording medium 82 such as a magnetic disk, an optical disk, a magneto-optical disk, or a semiconductor memory is attached to the input/output interface 75, as appropriate.

With the drive 81, a data file such as an image file or various kinds of computer programs can be read out from the removable recording medium 82. The read data file is stored in the storage section 79, or an image and a sound included in the data file are outputted through the display section 77 and the sound output section 78. In addition, the computer program, etc., read out from the removable recording medium 82 is installed into the storage section 79, if needed.

Software for processing according to the present embodiment, for example, can be installed into the information processing device 70 through network communication which is performed by the communication section 80 or through the removable recording medium 82. Alternatively, such software may be stored in advance in the ROM 72 or in the storage section 79.

4. COMPOSITION PROCESS AND DEVELOPMENT PROCESS

Here, a composition process and a development process that are performed on image data by the image processing section 20 of the image capturing device 1 or the information processing device 70 will be explained.

For example, the image processing section 20 can generate one or more pieces of composite RAW image data by composing multiple pieces of RAW image data in order to edit a shutter speed after image capturing.

Figure 4:
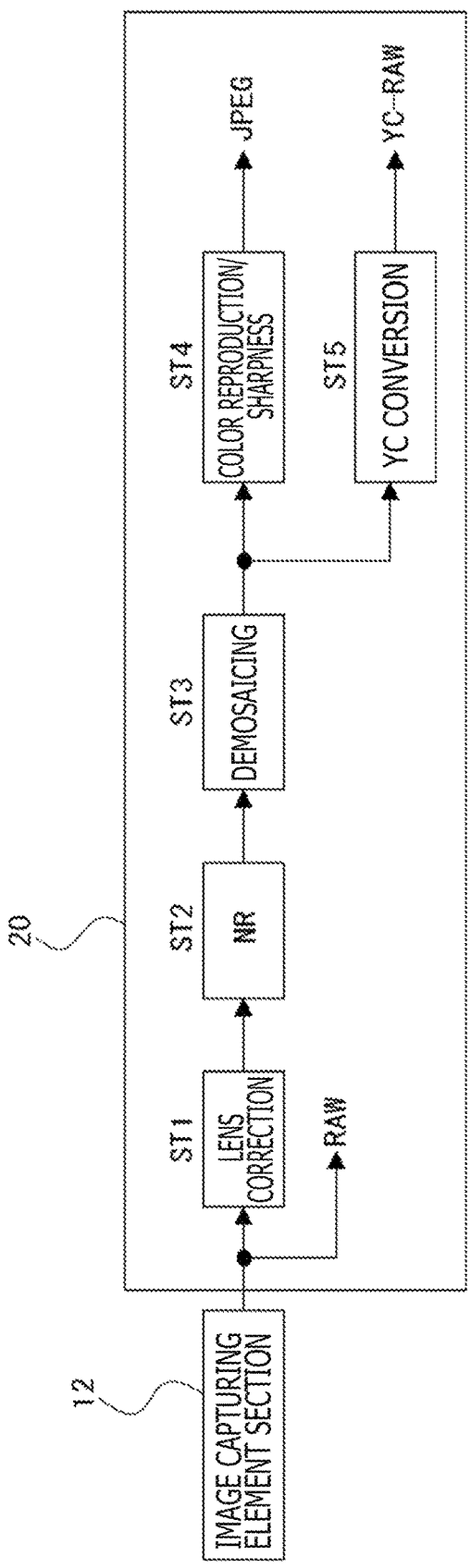
FIG. 4 is an explanatory diagram of a development process of image data.

First, FIG. 4 schematically depicts the flow of a development process that is performed by the development processing section 32 of the image processing section 20.

For example, image data inputted from the image capturing element section 12 is RAW image data, or is RAW image data that has undergone preprocessing, which is not depicted.

It is to be noted that RAW image data is represented as image data inputted from the image capturing device 12 in FIG. 4 based on an assumption that the image capturing device 1 is used. In the case of the information processing device 70, the RAW image data may be the one read out from the storage section 79, for example.

In the development process in a broad sense, step ST1: lens correction, step ST2: NR (noise reduction), step ST3: demosaicing, and step St4: color reproduction/sharpness processing, which is a development process in a limited sense, are performed, for example.

As a result, JPEG image data, for example, is generated as image data that has undergone the development process described above.

In addition, if step ST5: YC conversion is performed after the demosaicing, YC-RAW image data is obtained.

FIGS. 5A, 5B, 6A, 6B, and 6C depict examples of the relationship between the development process which is performed in the development processing section 32 and the composition process which is performed in the composition processing section 31.

Figure 5:
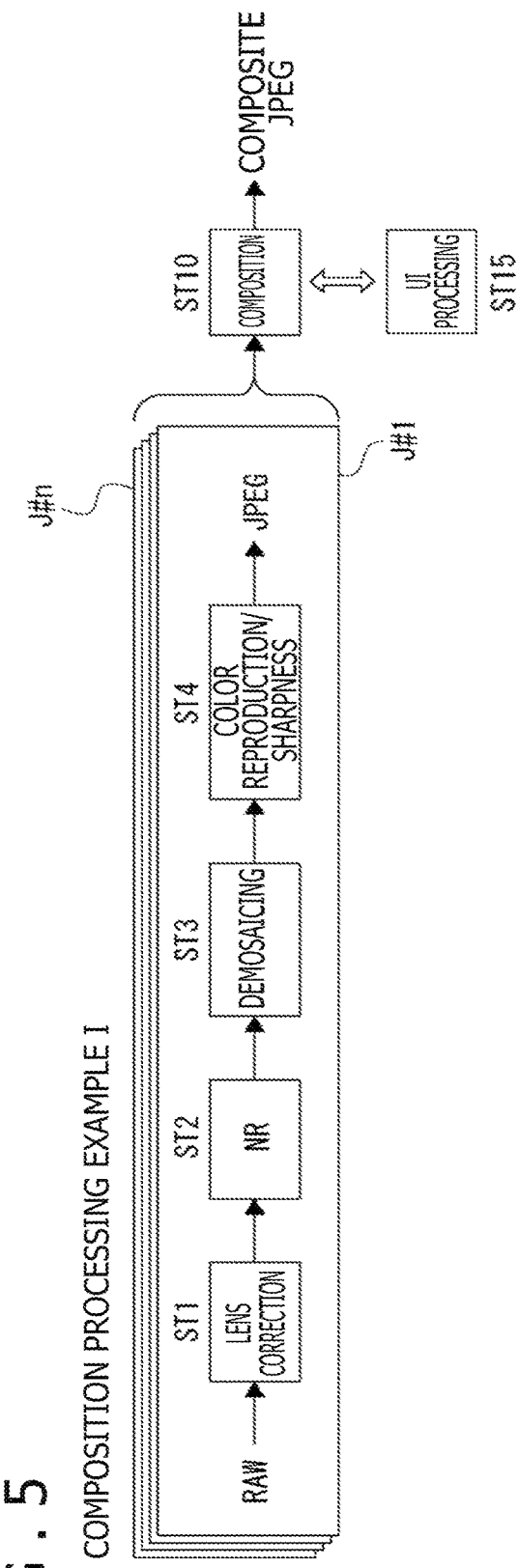
FIG. 5 depicts explanatory diagrams of a composition process and a development process according to the embodiment.
Figure 5:
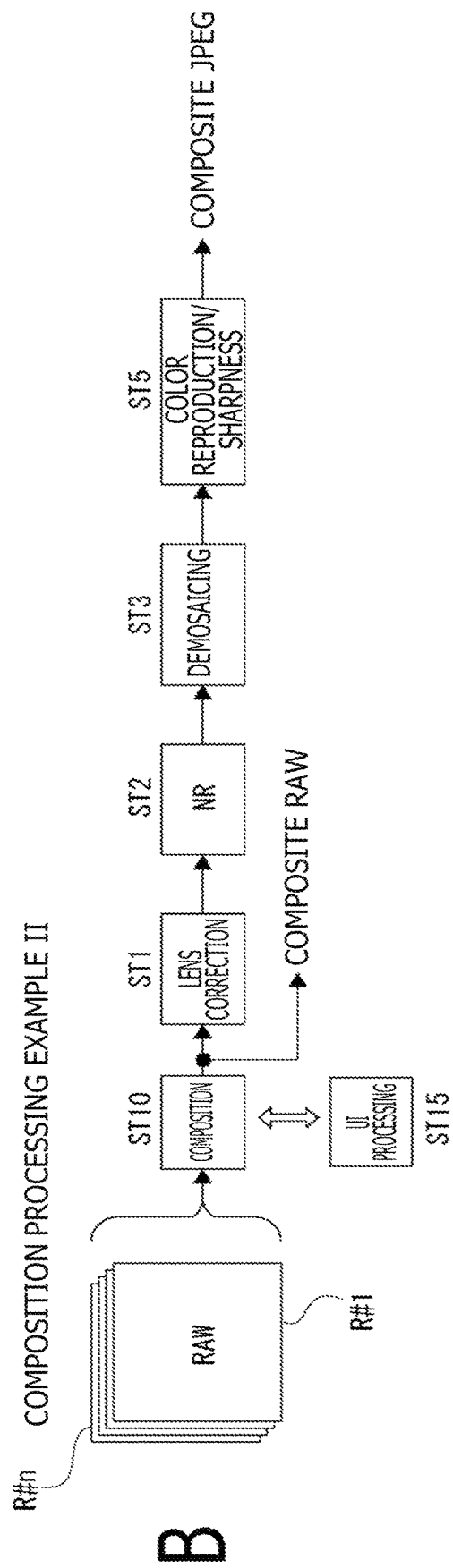

In a composition processing example I in FIG. 5A, pieces of JPEG image data are composed. FIG. 5A depicts multiple pieces of JPEG image data (J #1 to J #n) each of which has been generated as a result of the development process (steps ST1, ST2, ST3, and ST4) of RAW image data.

Step ST10: composition process is performed on the multiple pieces of JPEG image data (J #1 to J #n), so that composite JPEG image data is generated.

In a composition processing example II in FIG. 5B, pieces of RAW image data are composed.

FIG. 5B depicts multiple pieces of RAW image data (R #1 to R #n) as pieces of image data to be composed. For example, step ST10: composition process is performed on the multiple pieces of RAW image data (R #1 to R #n). Accordingly, composite RAW image data is obtained.

In addition, the development process including steps ST1, ST2, ST3, and ST4 is performed on the composite RAW image data. Accordingly, JPEG image data is generated as a composite image.

In a case where pieces of RAW image data are composed as depicted in FIG. 5B, the following advantageous effects are provided.

For example, in a case where multiple pieces of JPEG image data (J #1 to J #n) each having undergone the development process are composed, as depicted in FIG. 5A, the following points are indicated.

First, the development process in a broad sense (steps ST1, ST2, ST3, and ST4) is required for each of the multiple pieces of image data to be composed. If, for example, each piece of JPEG image data (J #1 to J #n) should be saved, there is no problem. However, in a case where only a composite image should be saved, a processing load is increased.

In addition, the development process is performed by signal processing optimized for each of the image data. Thus, the signal processing is not necessarily optimal for the composite image data.

Moreover, since the composite image has undergone the development process, the editability thereof is limited. Specifically, this is because part of original information included in RAW image data is deleted by color information or the like being removed in step ST4: color reproduction/sharpness processing.

On the other hand, in a case where pieces of RAW image data are composed as depicted in FIG. 5B, it is sufficient that the development process is performed only once after the composition. Accordingly, the signal processing load is reduced. In addition, since a parameter optimized for the composite RAW image data obtained after composition can be used in the development process, the image quality of the developed image data, or the abovementioned JPEG image data, for example, can be improved.

In addition, loss of information due to image processing does not occur in composite RAW image data for which image processing involving color reproduction/sharpness processing, etc., has not been conducted. Thus, the composite PAW image data has high editability concerning color reproduction, for example.

As described above, when multiple pieces of RAW image data are composed, signal processing that is optimized for the composite image and brings high efficiency can be performed.

Figure 6:
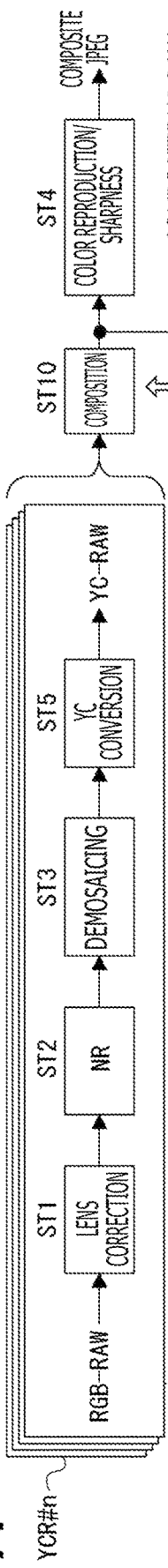
FIG. 6 depicts explanatory diagrams of a composition process and a development process according to the embodiment.
Figure 6:
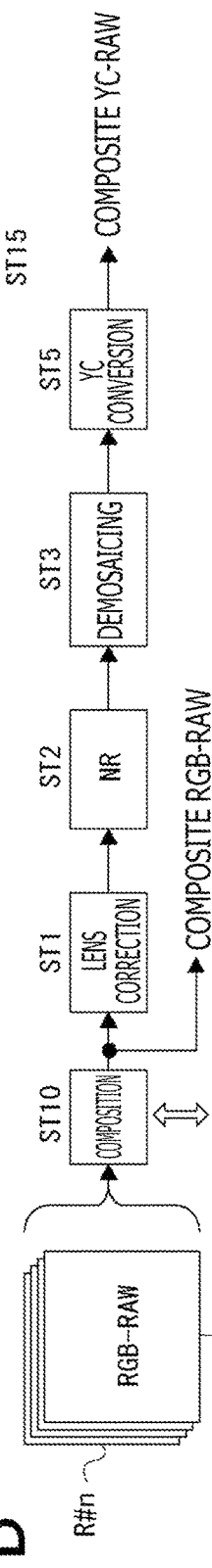
Figure 6:
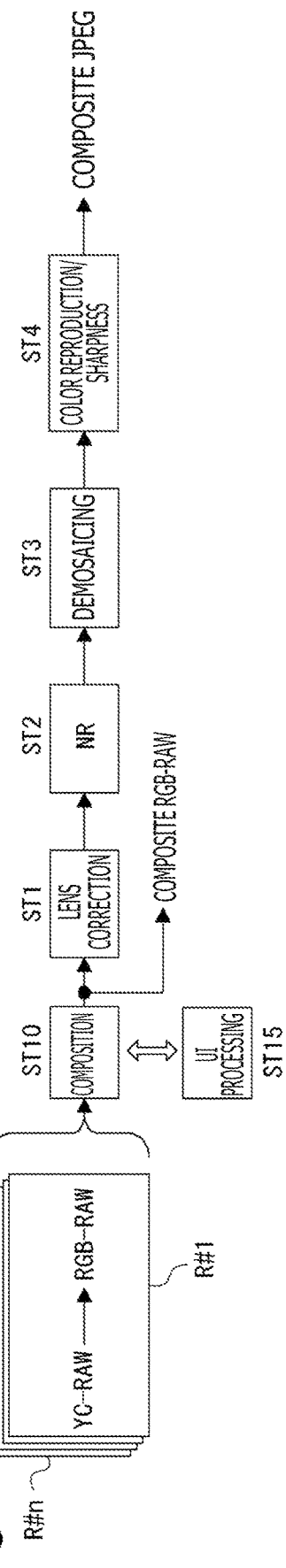

Next, a composition processing example III in FIG. 6A is an example of a composition process using YC-RAW image data.

It is to be noted that, to make a distinction from YC-RAW image data, RAW image data in an R, G, and B format obtained by the image capturing element section 12 is expressed as "RGB-RAW image data" in FIGS. 6A, 6B, and 6C, for convenience of explanation. Moreover, composite RAW image data generated from RGB-RAW image data is expressed as "composite RGB-RAW image data."

Multiple pieces of YC-RAW image data (YCR #1 to YCR #n) are depicted in FIG. 6A. That is, the multiple pieces of YC-RAW image data are obtained by performing steps ST1, ST2, ST3, and ST5 on RGB-RAW image data.

Step ST10: composition process is performed on the multiple pieces of YC-RAW image data (YCR #1 to YCR #n), so that composite YC-RAW image data is generated. In addition, step ST4: color reproduction/sharpness processing is performed on the composite YC-RAW image data, so that, for example, JPEG image data is generated as a composite image.

In a composition processing example IV in FIG. 6B, step ST10: composition process is performed on multiple pieces of RGB-RAW image data (R #1 to R #n), whereby composite RGB-RAW image data is generated, and further, steps ST1, ST2, ST3, and ST5 are performed to generate composite YC-RAW image data.

In a composition processing example V in FIG. 6C, pieces of RGB-RAW image data (R #1 to R #n) are restored from multiple pieces of YC-RAW image data, and then, are composed. Step ST10: composition process is performed on multiple pieces of RGB-PAW image data (R #1 to R #n) restored from the multiple pieces of YC-RAW image data, whereby composite RGB-RAW image data is generated, and further, steps ST1, ST2, ST3, and ST4 are performed to generate JPEG image data as a composite image.

A composition process using YC-RAW image data such as those in the abovementioned examples is possible. Since color reproduction/sharpness processing has not been performed on YC-RAW image data, information in the original PAW image data is not lost in the YC-RAW image data. Hence, advantageous effects similar to those in the composition of PAW image data in FIGS. 5A and 5B can be obtained.

In each of the abovementioned examples in FIGS. 5A, 5B, 6A, 6B, and 6C, step ST15: UI processing is performed for step ST10: composition process. The UI processing is processing performed by the UI control section 30. The UI processing involves display control on the UI screen 100, detection of a user operation using the UI screen 100, and settings concerning the composition process based on the display control and the detection.

Through the UI processing, the user can perform desired setting for image composition in each of the examples.

Here, a concept of editing a shutter speed to be implemented in the abovementioned composition process will be explained.

It is assumed that pieces of image data to be composed in the abovementioned examples, such as multiple pieces of RGB-RAW image data (R #1 to R #n), multiple pieces of JPEG image data (J #1 to J #n), or multiple pieces of YC-PAW image data (YCR #1 to YCR #n), are pieces of image data of an image group including time sequentially recorded images.

The shutter speed for the generated composite image is thus obtained by multiplying the shutter speed used when one (one frame) image data is captured, by the number of composed images.

For example, when 100 pieces of consecutively taken RAW image data are composed at the shutter speed=1/100 second, a composite image at a shutter speed=1 second is obtained.

Under such a concept, the shutter speed can be edited after image capturing.

It is to be noted that the multiple pieces of time sequential image data are not necessarily taken without an interruption of the exposure period. For example, an image capturing operation of the image sensor 12a involves an exposure period and a reading period for reading exposed electric charges. Thus, the exposure periods of frames of a captured video are not continuous in a strict sense.

For this reason, an expression of editing the shutter speed is not correct in a strict sense, but editing the shutter speed in the composition process need not necessarily mean editing the shutter speed in a strict sense. In a case where multiple pieces of PAW image data the exposure periods of which are not continuous are composed, it can be considered that the shutter speed is edited in a pseudo sense.

However, edition of the shutter speed in a stricter sense can be achieved, and edition of the shutter speed in a strict sense can be achieved.

To achieve edition of the shutter speed in a stricter sense, an addition process can be performed. In the addition process, the exposure periods of the multiple pieces of RAW image data are made continuous, or an interruption of the exposure periods is suppressed. Specifically, in each of the multiple pieces of RAW image data, an exposure amount that corresponds to a non-exposure period of the image sensor 12a is added to an exposure amount during the exposure period of the image sensor 12a.

Figure 7:
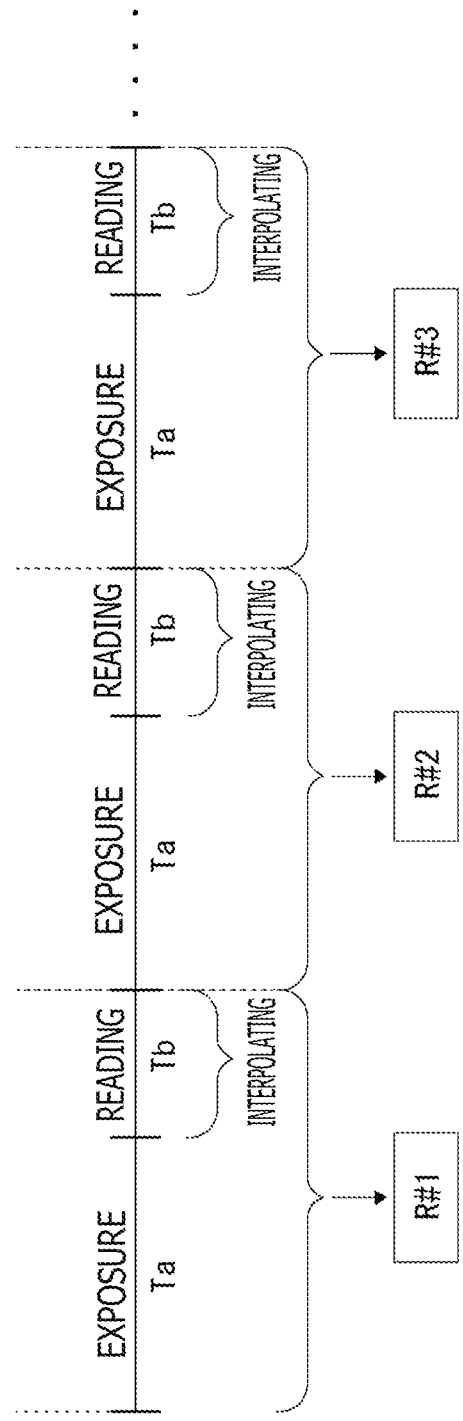
FIG. 7 is an explanatory diagram of an addition process of making exposure periods continuous according to the embodiment.

An explanation is given with reference to FIG. 7. In FIG. 7, exposure periods Ta and reading periods Tb for reading electric charges generated by exposure are depicted as an image capturing operation of the image sensor 12a. It is to be noted that, in practice, there are a period during which neither exposure nor reading is performed and a reset period, but such periods are included in the reading period Tb, in order to simplify the illustration and the explanation.

As a result of operation in the exposure period Ta and the reading period Tb, one frame image data is obtained. When continuous image capturing or video capturing is performed, the exposure periods Ta and the reading periods Tb are repeated.

However, in the reading period Tb, exposure is not performed in the image sensor 12a. As such, when the multiple pieces of RAW image data are composed, composite image data is not one for which the shutter speed is simply reduced, that is, the exposure time is made long, in an exact sense.

Hence, a process of adding an exposure amount which is pixel information during a reading period to a pixel value is performed, whereby image data having a non-interrupted exposure period Ta is generated.

In one example, interpolation calculation on pixel values in one frame is performed in view of the period length ratio of the exposure period Ta and the reading period Tb and the change amount of the pixel values of the previous and next frames before the addition process is performed, so that pixel values that would be obtained when exposure is further performed during the reading period Tb are obtained. Further, the addition process is performed on each of the pixel values, whereby pieces of RAW image data R #1, R #2, R #3, . . . are obtained.

Accordingly, the pieces of RAW image data R #1, R #2, R #3, . . . can become multiple pieces of RAW image data the exposure periods Ta of which are not interrupted.

JPEG image data or YC-RAW image data generated from the pieces of RAW image data R #1, R #2, R #3, . . . can also become sequential image data having a non-interrupted exposure period Ta.

In order to obtain image data on which edition of the shutter speed in a strict sense can be performed, multiple image sensors 12a1 and 12a2 are provided to the image capturing element section 12. In that case, multiple pieces of PAW image data the exposure periods Ta of which are not interrupted can be obtained without the abovementioned addition process.

Figure 8:
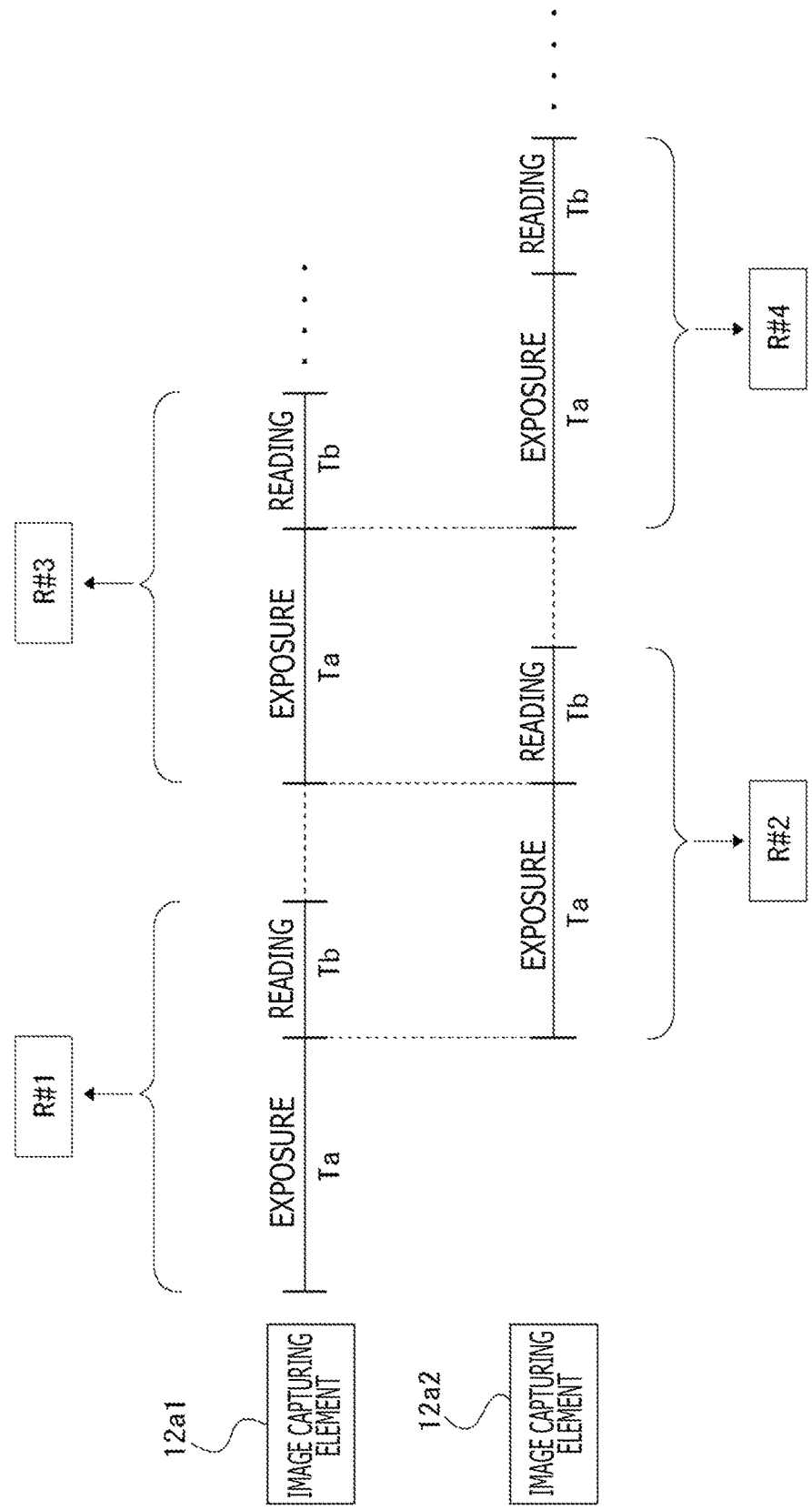
FIG. 8 is an explanatory diagram of capturing RAW image data the exposure periods of which are continuous according to the embodiment.

As depicted in FIG. 8, RAW image data R #1 is obtained from an output of the image sensor 12a1, for example. Next, RAW image data R #2 is obtained from an output of the image sensor 12a2.

Here, the image sensor 12a1 and the image sensor 12a2 are synchronized while the respective exposure timings are deviated from each other. That is, the exposure period Ta of the image sensor 12a2 is started at the end timing of the exposure period Ta of the image sensor 12a1, and the exposure period Ta of the image sensor 12a1 is started at the end timing of the exposure period Ta of the image sensor 12a2, as depicted in FIG. 8.

As a result, pieces of RAW image data R #1, R #2, R #3, R #4, . . . that are alternately obtained from the image sensors 12a1 and 12a2 are image data having a continuous exposure period. JPEG image data or YC-RAW image data generated from the pieces of RAW image data R #1, R #2, R #3, . . . also can become sequential image data having a non-interrupted exposure period Ta.

In addition, even in a case where one image sensor 12a is used, when an interruption of the exposure period caused by the reading period Tb can be almost ignored, or a moving subject is not included in a desired image, the composition process is performed without the abovementioned addition process being performed, so that shutter speed editing that is practically sufficient can be achieved by the composition process. In other words, the addition process may be performed for an image capturing device or an image capturing scene in which the influence of an interruption of the exposure period is great.

5. UI PROCESSING EXAMPLE

Hereinafter, an example of UI processing will be explained.

An example of the UI processing according to the embodiment provides the user with a favorable operability for composing and editing images.

Figure 9:
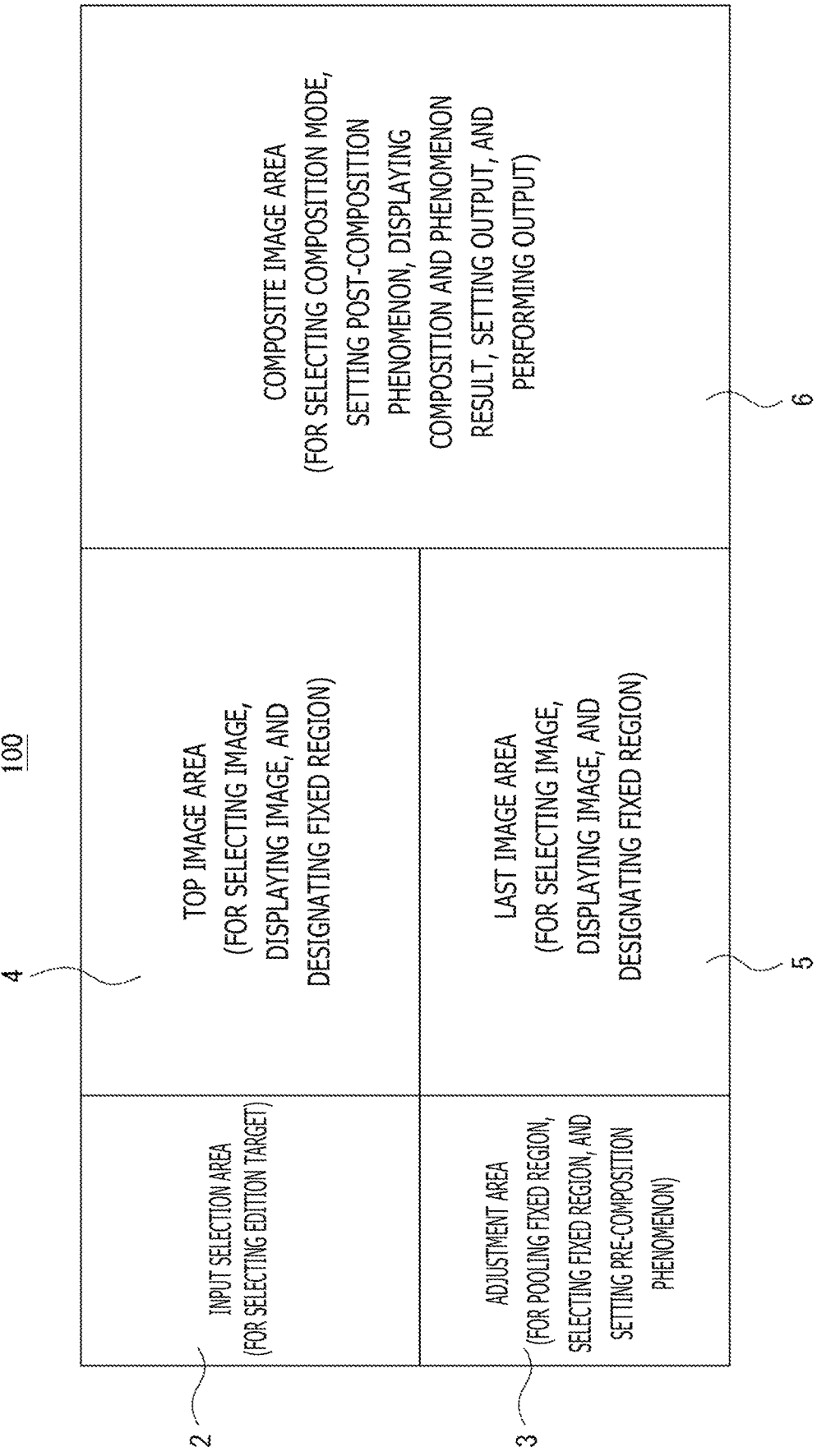
FIG. 9 is an explanatory diagram of a screen constitution of a UI screen according to the embodiment.

FIG. 9 depicts an example of a screen constitution of the UI screen 100.

The UI screen 100 includes an input selection area 2, an adjustment area 3, a top image area 4, a last image area 5, and a composite image area 6, for example. This is one example. Any other area may be provided, or any one of the areas may be omitted.

The above areas are simultaneously displayed on one screen, for example. In particular, it is desirable that these areas be displayed without involving screen scrolling or page feeding.

The input selection area 2 is an area provided for selecting an object to be edited, or selecting an image group to be subjected to the composition process as image editing.

The adjustment area 3 is an area provided for pooling a fixed region, which will be explained later, designating a fixed region, and performing development setting.

The top image area 4 is an area provided for displaying an image determined as a top image of the composition process, selecting a top image, and designating a fixed region.

The last image area 5 is an area provided for displaying an image determined as a last image of the composition process, selecting a last image, and designating a fixed region.

The composite image area 6 is an area provided for selecting a composite mode (composition process method), performing setting for development that follows the composition process, displaying an image that is a composition result or development result, and performing an output setting and output operation.

The user interface using the UI screen 100 described above has the following characteristics (a) to (f).

(a) Having an input interface for an image group including multiple time sequential images.

For example, a user can select an image group of RAW image data or an image group of JPEG image data through display or operation in the input selection area 2, so that the image group can become a setting operation target on the UI screen 100.

In addition, not only an image group in which multiple images are packed by continuous image capturing at the time of image capturing or the like, but also an image group which includes multiple images that are selected one by one by a user may be formed.

Therefore, selectable image groups or individual images are displayed in the input selection area 2 such that a user can make a selection.

(b) Having a display frame of an image to be processed on the UI screen.

For example, two or more frames of image display areas are provided such that a top image and a last image for indicating the composition range can be compared with each other and checked. A top image area 4 and a last image area 5 correspond to the display frames.

It is to be noted that PAW images may be selected as images to be displayed in the top image area 4 and the last image area 5, but, when RAW image data is displayed as it is, the visibility of the image is not good. Thus, in a case where RAW image data is the image data for which image display is to be performed, it is desirable to perform a process for displaying an easily visible image.

For example, a development process based on development setting for allowing a user to easily edit the RAW image data is automatically performed on the RAW image data, and the resultant developed image data is displayed.

Alternatively, developed image data associated with the RAW image data is displayed. For example, it is assumed that, when image capturing is performed, JPEG image data or thumbnail image data is recorded with RAW image data.

In this case, even if the RAW image data is selected as an edit target, the JPEG image data and the thumbnail image data that correspond to the RAW image data are displayed in the top image area 4 and the last image area 5.

(c) A composition edit can be performed.

A top image can be selected or changed in the top image area 4. In addition, a last image can be selected or changed in the last image area 5. The selection or change is intended to edit a composition range.

In addition, a fixed region can be designated in the top image or the last image. The fixed region is a region in which an in-frame position is fixed throughout images for multiple pieces of image data to be composed.

For example, the region of a specific subject is determined as a fixed region.

In addition, a composition mode that indicates a composition method for performing the composition process can be selected on the UI screen 100.

(d) Having a frame for displaying a composition result.

The composite image area 6 is provided, so that the user can check a composition result that is based on the current composition settings.

(e) Development settings for a composite image can be performed.

For example, development settings can be performed through a user interface using the composite image area 6. It is to be noted that the setting result may be displayed in the composite image area 6, or may be displayed in another frame.

(f) A format for outputting a composition result can be selected, and a command to output the composition result can be given.

For example, to output the composition result, a selection between using RAW image data and using an image developed according to the development settings can be made.

Figure 10:
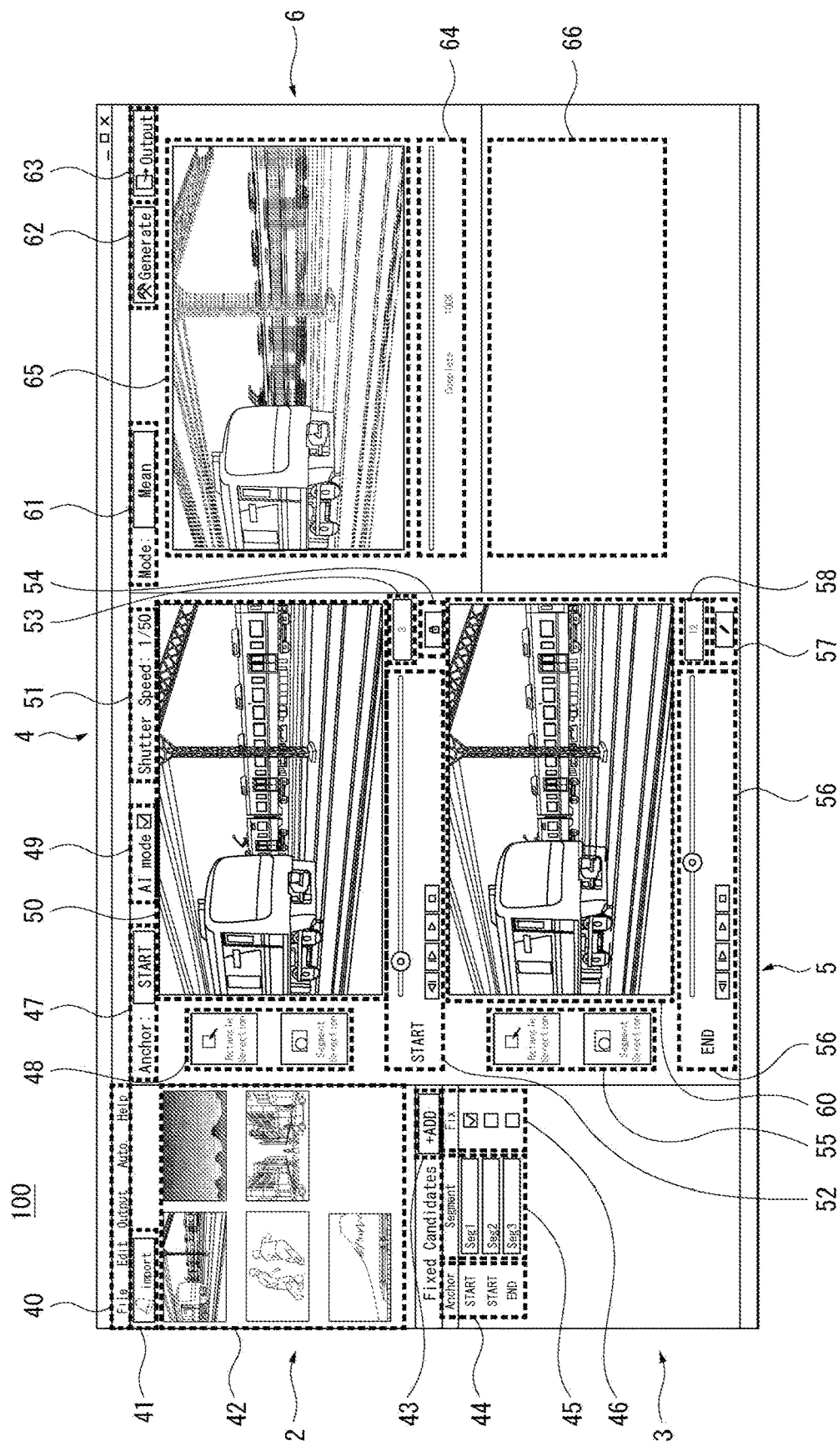
FIG. 10 is an explanatory diagram of a UI screen example in the embodiment.

A specific example of the UI screen 100 having the abovementioned characteristics is depicted in FIG. 10. As depicted in FIG. 10, on the UI screen 100, at least a top image 50 and a last image 60 are simultaneously displayed, and further, various kinds of display for image composition are displayed.

In the example of the UI screen 100 in FIG. 10, a menu section 40 is disposed on the upper left side of the screen. Operation elements "File," "Edit," "Output," "Auto," "Help," etc., are provided in the menu section 40. With these operation elements, various edit operations such as selecting or saving an image file, output settings, automatic processing settings, and help display can be performed through the menu section 40.

An import button 41 and a list section 42 are provided in the input selection area 2.

The import button 41 is an operation element for loading a raw material (image group) to be edited, and adding the loaded raw material to the list section 42.

The list section 42 indicates a list of imported image groups. For example, a thumbnail image or the like which is a representative image is used to display each of the image groups. Alternatively, a file name or the like of each of the image groups may be displayed.

An addition button 43, a fixed region type 44, a fixed region name display section 45, and a fixed region designation section 46 are provided in the adjustment area 3.

The addition button 43 is an operation element for adding a selected fixed region to a region pool. It is to be noted that a region pool refers to a storage region in which a fixed region set for an image group to be processed is saved.

Further, a list of the fixed regions saved in the region pool is displayed in the adjustment area 3.

To display whether a fixed region saved in the pool has been designated in the top image 50, or has been designated in the last image 60, "start" or "end" is displayed in the fixed region type 44.

The names of fixed regions saved in the pool are displayed in the fixed region name display section 45.

In the fixed region designation section 46, a check box is used to designate a fixed region for use in a composition process from among the fixed regions saved in the pool. One or more fixed regions can be designated for use.

A fixed region setting image display section 47, a fixed region designation mode operation section 48, an AI support mode display section 49, the top image 50, a shutter speed display section 51, a bar/reproduction operation element display section 52, a frame number display section 53, and an edit button 54 are provided in the top image area 4.

To indicate in which of the top image 50 and the last image 60 a fixed region is set, "start" or "end" is displayed in the fixed region setting image display section 47.

In the AI support mode display section 49, enabling/disabling of an AI support mode when a fixed region is selected can be designated in a check box. An AI support mode will be explained in the second embodiment.

The shutter speed display section 51 displays a shutter speed that is calculated on an assumption that the composition process is performed on the current composition range, or the range of the top image 50 to the last image 60.

It is to be noted that the fixed region setting image display section 47, the AI support mode display section 49, and the shutter speed display section 51 may be displayed in an area other than the top image area 4.

The fixed region designation mode operation section 48 allows switching of a fixed region designation mode in the top image area 4. In the fixed region designation mode, a user is allowed to perform selection to make a rectangle selection for selecting a rectangular range, or make a segment selection for selecting a subject region, for example. It goes without saying that any other fixed region designation modes may be provided to be selectable.

The top image 50 is an image disposed at the top of the composition range. Since the top image 50 can be changed by a user's operation, the current top image 50 is displayed in the top image area 4.

The bar/reproduction operation element display section 52 which includes a slide bar and a reproduction operation element is displayed below the top image 50.

The slide bar is provided to indicate a time axis of an image group to be processed. By moving a pointer on the slide bar, for example, the user can select the top image 50.

In addition, the reproduction operation element is provided to perform a reproduction operation, a stop operation, a frame-by-frame advance operation, and a frame-by-frame reverse operation. As a result of these operations, the top image 50 is switched. By operating these reproduction operation elements to feed images forward or back in the image group, the user can select the top image 50.

The frame number of the image set as the current top image 50, or, for example, a frame number in the image group, is indicated in the frame number display section 53. For example, in a case where the image group includes 30 images, any one of "1" to "30" is displayed.

By inputting a numerical value in the frame of the frame number display section 53, the user can select the top image 50 by using the frame number.

The edit button 54 is an operation element that is operated to perform editing in the top image area 4. That is, to select the top image 50 or designate a fixed region in the top image 50, the user operates the edit button 54. Accordingly, editing using the top image area 4 can be performed.

A fixed region designation mode display section 55, the last image 60, the bar/reproduction operation element display section 52, a frame number display section 58, and an edit button 57 are provided in the last image area 5.

The fixed region designation mode operation section 48 allows switching of a fixed region determination mode in the last image area 5. As in the top image area 4, the user can perform selection to make a rectangle selection or a segment selection, for example.

The last image 60 is an image set as the end of the composition range. The last image 60 can be changed by a user operation or the like. Thus, the current last image 60 is displayed in the last image area 5.

A bar/reproduction operation element display section 56 which includes a slide bar and a reproduction operation element are displayed below the last image 60.

The slide bar is provided to indicate a time axis of an image group to be processed. By moving a pointer on the slide bar, for example, the user can select the last image 60.

In addition, the reproduction operation element is provided to perform a reproduction operation, a stop operation, a frame-by-frame advance operation, and a frame-by-frame reverse operation. As a result of these operations, the last image 60 is switched. By operating these reproduction operation elements to feed images forward or back in the image group, the user can select the last image 60.

The frame number of the image set as the current last image 60, or, for example, a frame number in the image group, is indicated in the frame number display section 58. Further, by inputting a numerical value in the frame of the frame number display section 58, the user can select the last image 60 by using the frame number.

The edit button 57 is an operation element that is operated to perform editing in the last image area 5. That is, to select the last image 60 or designate a fixed region in the last image 60, the user operates the edit button 57. Accordingly, editing using the last image area 5 can be performed.

A composition mode setting section 61, a composition execution button 62, a save button 63, a composition progress display section 64, a composite image 65, and a history display section 66 are provided in the composite image area 6.

The composition mode setting section 61 is provided for a user to select a composition mode. An addition averaging mode, a lightening mode, and a weighting mode can be selected in the form of pull-down menus, for example.

The addition averaging mode is a composition process mode for averaging respective pixel values in multiple pieces of image data included in the composition range, and using the averaged pixel value as the pixel value of a composite image.

The lightening mode is a mode for performing image composition using only a valid pixel value that is equal to or greater than a predetermined brightness value.

The weighting mode is a composition process mode for composing multiple pieces of image data included in the composition range while changing the weights of some pieces of the image data. The lightening mode and the weighting mode will be explained later.

The composition execution button 62 is an operation element for executing a composition process.

The save button 63 is an operation element for giving a command to save composite image data. It is to be noted that a format of composite image data to be saved can be made selectable.

As the composite image 65, an image obtained by performing the composition process of multiple pieces of image data including the currently determined top image 50 to the currently determined last image 60 is displayed.

This composite image may be obtained by composing multiple images ranging from the top image 50 to the last image 60 in a specific composition process setting, or may be obtained by the composition process in which the current composition mode setting is reflected. Moreover, in a case where a development process setting has been set, an image having undergone a development process may be displayed.

The composition progress display section 64 is disposed below the composite image 65. When the composition process is being executed, the progress thereof is represented by the length of a bar, for example.

In addition, the history of the composition processes and the history of saving are displayed in the history display section 66.

It is to be noted that the above explanation describes a representative example of the UI screen 100. Any other display and operation elements can be included.

For example, in the example in FIG. 10, a user interface that is required to perform a development setting is not indicated. However, such a user interface is expected to be provided in the adjustment area 3 or the composite image area 6.

A user's composition process setting using the abovementioned UI screen 100 will be explained.

The user performs an operation of selecting a desired image group from among imported image groups which are listed in the list section 42. Then, the selected image group is determined as a target of a composition process setting, and the display of the image group is started.

That is, a fixed region that has been pooled for the image group in the past is displayed in the adjustment area 3.

The default top image 50 and the default last image 60 are displayed in the top image area 4 and the last image area 5.

For example, in the default setting, both the top image 50 and the last image are set as a first frame image of the image group.

Alternatively, in the default setting, the top image 50 may be set as a first frame of the image group while the last image 60 may be set as a second frame of the image group.

Alternatively, in the default setting, the top image 50 may be set as a first frame of the image group while the last image 60 may be set as the last frame of the image group.

Moreover, in the default setting, the top image 50 and the last image 60 that have been set in the image group during the past edit process for the image group may be displayed.

In addition, a main subject in a certain time range may be determined by image analysis of the images included in the image group, and the first one of frames in which the main subject is included may be determined as the top image 50, and the last one of the frames in which the main subject is included may be determined as the last image 60.

Thereafter, the user can select any image as the top image 50 and the last image 60 by using the top image area 4 and the last image area 5.

For example, by using the slide bars and reproduction operation elements of the bar/reproduction operation element display sections 52 and 56, the user selects the top image 50 and the last image 60.

In addition, by inputting a shutter speed value in the shutter speed display section 51, the user may set a composition range that corresponds to the inputted shutter speed with respect to either the top image 50 or the last image 60.

Alternatively, the composition range that corresponds to the inputted shutter speed may be set with respect to the center frame of the current range of the top image 50 to the last image 60.

In addition, through the composition execution button 62, a composition process for the composition range of the currently selected top image 50 to the currently selected last image 60 is executed, to allow the composite image 65 to be checked.

It is to be noted that, without the user operating the composition execution button 62, the composition process may be executed and the composite image 65 may be updated each time the top image 50 or the last image 60 is changed.

The shutter speed display section 51 displays a shutter speed that will be obtained by a composition process for the composition range of the top image 50 to the last image 60, so that the user can perform a work while identifying a shutter speed that will be provided for the image by the current composition range.

In addition, frames to be determined as the top image 50 and the last image 60 can be selected while the content in the images is viewed. Therefore, a composition range can easily be selected.

In addition, the user can easily identify the composition range because the user can perform work while viewing the top image 50 to the last image 60 in one screen.

The user can also view the composite image 65 with the top image 50 and the last image 60. Thus, the user can perform an operation for selecting the top image 50 and the last image 60 while getting hold of a composite image.

In addition, the user can designate a fixed region of the composition process.

Figure 11:
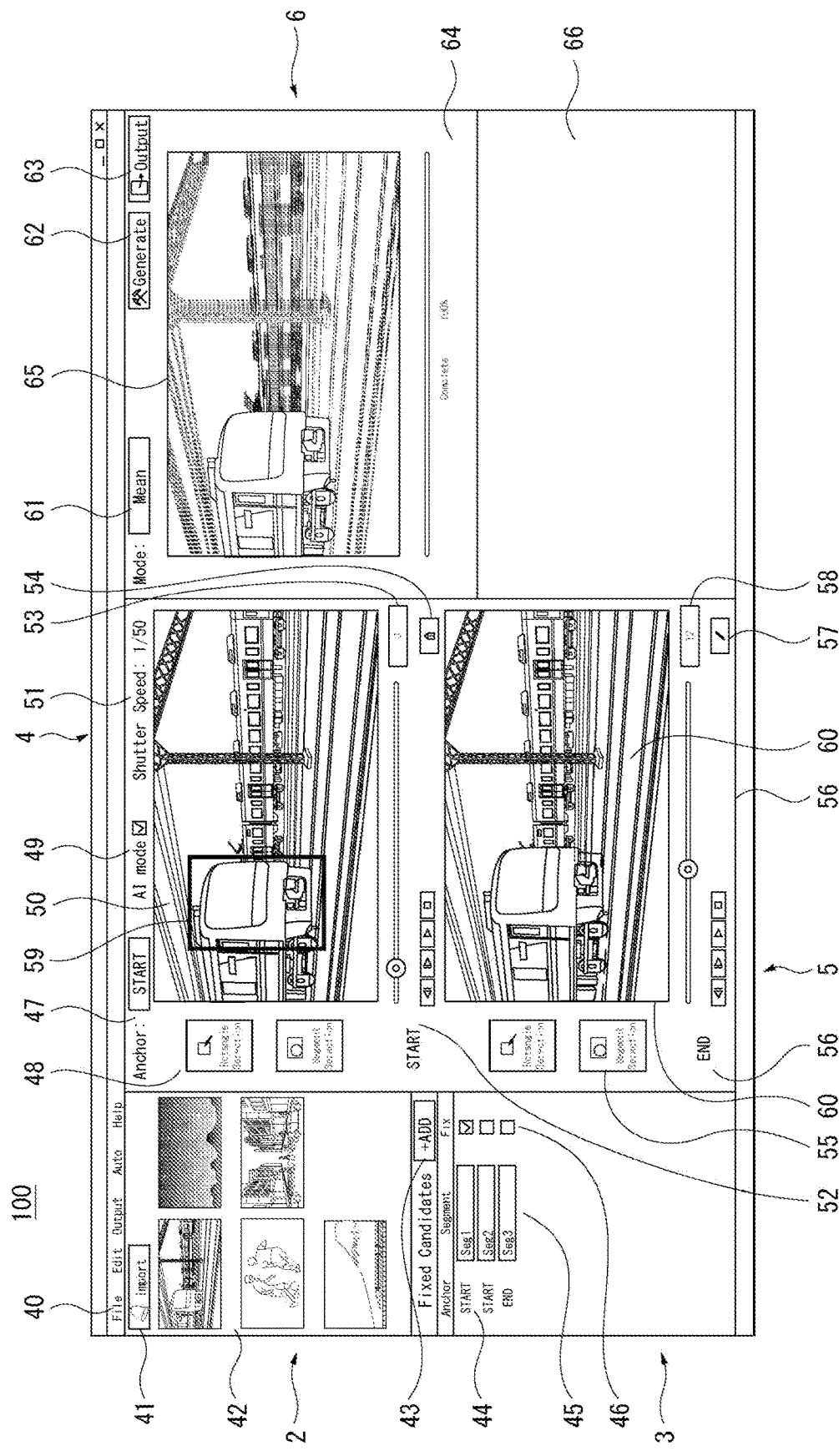
FIG. 11 is an explanatory diagram of setting of a fixed region on a UI screen according to the embodiment.

FIG. 11 depicts a state in which a fixed region frame 59 that indicates a fixed region is displayed.

The user can designate a pooled fixed region by using the adjustment area 3, and further, designate a new fixed region in the image.

For example, the user selects either the top image 50 or the last image 60, and designates a fixed region in the selected image. For example, by increasing/reducing the size of the fixed region frame 59 by a drag operation, the user determines the position of the fixed region frame 59 within a desired subject range. As a result, a region surrounded by the frame is determined as a fixed region.

Alternatively, by performing an operation of designating a range by freehand, the user may draw on the image the fixed region frame 59 having an irregular shape, whereby a fixed region is designated.

Alternatively, the user may designate multiple points in the image such that a rectangular range including the points is determined as a fixed region.

Alternatively, the user may designate a certain subject, the range of the subject, for example, a specific part such as the face or the body, may be automatically identified, and then, the region may be determined as a fixed region. In this case, object recognition such as semantic segmentation, for example, can be used to identify the subject range.

When the fixed region is set, the fixed region can be pooled by an operation performed on the addition button 43. After setting of the newly designated fixed region is pooled, the setting of the new fixed region can be used.

The designated fixed region is displayed by the fixed region frame 59, as depicted in FIG. 11.

In a case where the fixed region frame 59 is displayed on the top image 50, the images are composed while the in-frame positions of a subject image corresponding to the fixed region in all the images included in the composition range are adjusted to the in-frame position of the subject in the top image 50.

Accordingly, the subject in the fixed region does not blur in the composite image 65.

For example, in FIG. 11, it is assumed that a user obtains an image group by continuously imaging a train that is moving. For example, it is assumed that, during the continuous shooting, the user moves the image capturing device 1 from the left side to the right side according to the moving direction of the train. Hence, the image capturing directions of the images included in the image group are assumed to gradually change.

In this case, when the front part of the train is determined as a fixed region, the in-frame positions of the front part of the train in the respective pieces of image data are adjusted to the in-frame position of the front part of the train in the top image 50, and then, the composition process is performed. Accordingly, an image such as the composite image 65 depicted in FIG. 11, in which the front part of the train is clear while the background is blurred is obtained.

A fixed region may be designated in the last image 60.

In that case, the in-frame positions of the subject determined as the fixed region in every image data included in the composition range are adjusted to the in-frame position of the subject in the last image 60, and then, the composition process is performed.

Accordingly, even if the same subject region is designated, a composite image obtained in a case where the fixed region is determined in the top image 50 differs from a composite image obtained in a case where the fixed region is determined in the last image 60.

In a case where multiple fixed regions are set, the in-frame positions of the multiple fixed regions in all the images included in the composition range are adjusted, and then, the composition process is performed.

It is to be noted that designating a fixed region can be omitted. To disable the fixed region setting after enabling a pooled fixed region, it is sufficient to uncheck the fixed region designation section 46.

In addition, an operation for deleting the fixed region frame 59 can be performed after the user sets the fixed region frame 59 on an image, whereby the designation of the fixed region is canceled.

6. UI CONTROL EXAMPLE ACCORDING TO FIRST EMBODIMENT

An example of a process that is performed by the UI control section 30 while the abovementioned UI screen 100 is displayed will be explained with reference to FIG. 12.

Figure 12:
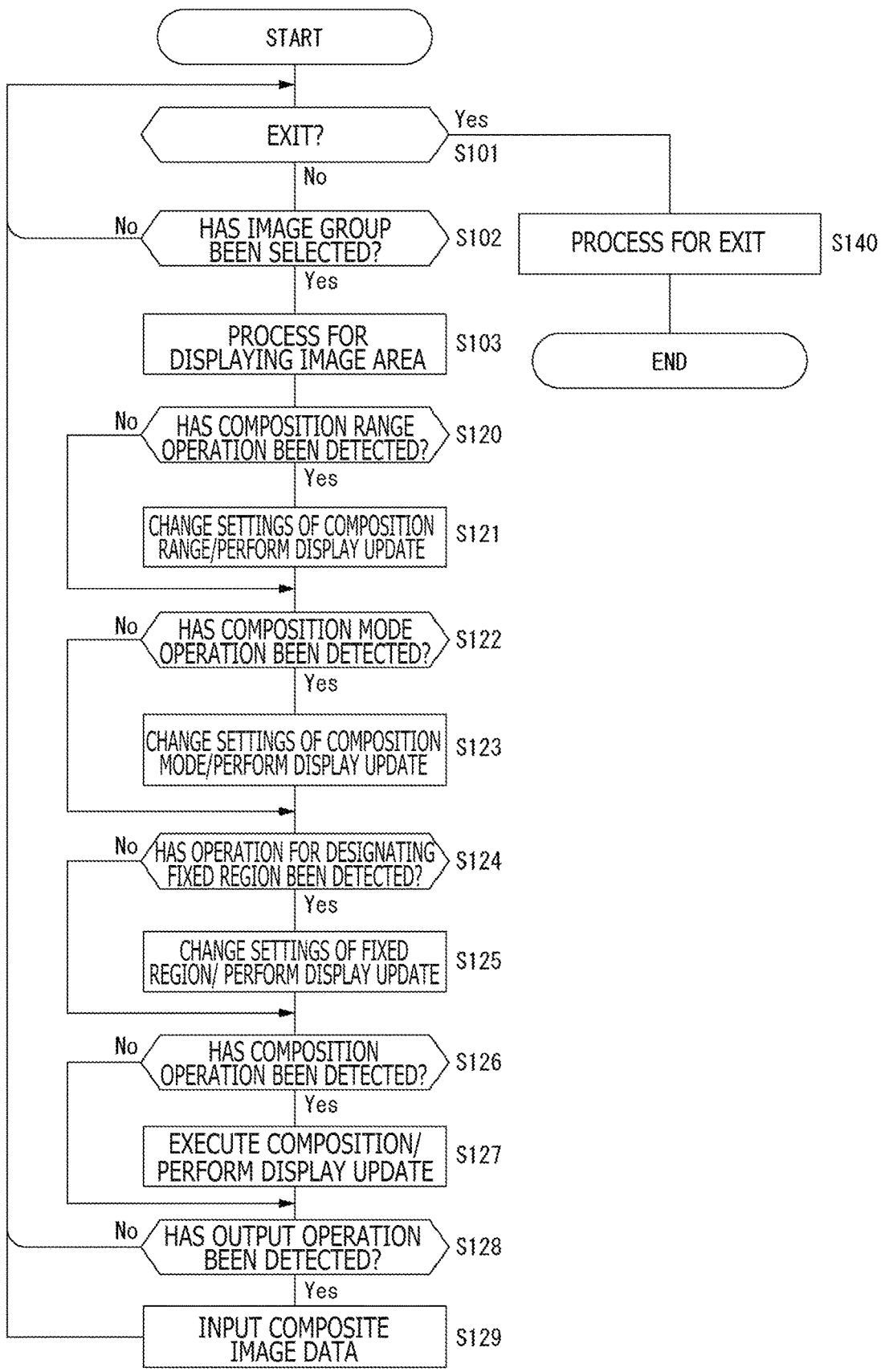
FIG. 12 is a flowchart of a UI control process according to a first embodiment.

FIG. 12 depicts a control processing example that is performed when the UI control section 30 displays the UI screen 100 on the display section 15 (or the display section 77 or any other display device).

In step S101, the UI control section 30 determines whether to exit a UI process. In a case where the UI control section 30 determines to exit the UI process because, for example, a user has closed the UI screen 100, the UI control section 30 advances from step S101 to step S140 where an exit process is performed to close the UI screen 100. Accordingly, the process in FIG. 12 ends.

After the UI screen 100 is opened, the UI control section 30 monitors an image group selection operation in step S102. It is to be noted that the UI screen 100 sequentially performs a process corresponding to an operation on the menu section 40 or an operation on the import button 41, which is omitted from the flowchart.

In a case where an operation of selecting an image group displayed in the input selection area 2 is performed, the UI control section 30 advances from step S102 to step S103 to perform a process for displaying image areas. In this step, the default top image 50 is displayed in the top image area 4, the default last image 60 is displayed in the last image area 5, and further, a fixed region that is pooled in association with the image group is displayed in the adjustment area 3.

The UI control section 30 may use specific frames of the selected image group as the default top image 50 and the default last image 60, or may use frames determined by image analysis, as described above. Alternatively, frames in which the setting in previous processing is reflected may be used.

In a state where the top image 50 and the last image 60 are displayed, the UI control section 30 repeats step S120 of monitoring an operation on the composition range, step S122 of monitoring a composition mode operation, step S124 of monitoring a fixed region designation operation, step S126 of monitoring a composition operation, and step S128 of monitoring an output operation.

It is to be noted that the UI control section 30 further performs monitoring of various operations and a process therefor. However, such monitoring and process are omitted in order to avoid complicated explanation.

When detecting a composition range operation performed by the user, the UI control section 30 advances from step S120 to step S121 to change the composition range setting and make a display change to reflect the setting change.

For example, an operation of changing the top image 50 or the last image 60 through the bar/reproduction operation element display section 52 or 56 is performed.

In a case where the user performs an operation of changing the top image 50 through the bar/reproduction operation element display section 52, the UI control section 30 changes the setting of the top image 50 and switches the displayed top image 50. In addition, the number in the frame number display section 53 and the value in the shutter speed display section 51 are also changed accordingly.

In a case where the user performs an operation of changing the last image 60 through the bar/reproduction operation element display section 56, the UI control section 30 changes the setting of the last image 60 and switches the displayed last image 60. In addition, the number in the frame number display section 58 and the value in the shutter speed display section 51 are also changed accordingly.

In another case, the user performs an operation of inputting a shutter speed value in the shutter speed display section 51. Alternatively, the user may specify the number of images to be composed, which is not depicted in FIG. 10. These operations are also regarded as operations for the composition range.

In a case where the user inputs a desired shutter speed value into the shutter speed display section 51, the UI control section 30 calculates a composition range that achieves the shutter speed, from the current top image 50, and determines, as the last image 60, a frame at the end of the composition range, for example.

Alternatively, the UI control section 30 calculates a composition range that achieves the shutter speed with respect to the current last image 60, and determines, as the top image 50, a frame at the top of the composition range.

Which of the top image 50 or the last image 60 is used as a reference image may be selected by the user. For example, an image in which a fixed region has been set may be used as a reference image.

In addition, a composition range that achieves the inputted shutter speed may be calculated with respect to a frame at the midpoint of a section ranging from the current top image 50 to the current last image 60, and frames at the top and the end in the composition range may be determined as the top image 50 and the last image 60.

Alternatively, the user may designate a reference frame within the composition range.

In a case where the user inputs the number of images to be composed, the following method is similarly possible.

When detecting that the user has operated the composition mode setting section 61, the UI control section 30 advances from step S122 to step S123 to change the setting of the composition mode, and change the display to reflect the setting change. The setting of a composition mode such as an addition averaging mode, a lightening mode, or a weighting mode, is changed, for example. In addition, the display state of the composition mode setting section 61 is switched to display any one of the modes.

When detecting that the user has performed an operation of designating a fixed region, the UI control section 30 advances from step S124 to step S125 to set a fixed region and perform a corresponding display change.

For example, the fixed region frame 59 is displayed, deformed, or repositioned according to the user operation. In addition, a fixed region that corresponds to the fixed region frame 59 is set.

Also when an operation is performed in the adjustment area 3, the UI control section 30 sets a fixed region and displays the fixed region frame 59 according to the operation in step S125.

When detecting that the user has operated the composition execution button 62, the UI control section 30 advances from step S126 to step S127 to perform the composition process and the corresponding display update.

For example, the UI control section 30 causes the image processing section 20 to perform the composition process on the current composition range. A command to perform a composition process in which the current composition mode or the current fixed region is reflected may be given. Further, a command to perform a development process in which the current development setting is reflected may be given.

Then, the composite image 65 which is obtained as the result of the composition process is displayed in the composite image area 6.

When detecting that the user has operated the save button 63, the UI control section 30 advances from step S128 to step S129 to record the current composite image. That is, the current composite image data is outputted to the recording control section 14 or the storage section 79, and the current composite image data is stored in the recording medium.

In this case, a data format of the image to be stored may be specified. In addition, the RAW image data may be recorded as it is, or the developed image data may be recorded.

Through the steps in FIG. 12, the user can perform an edit operation concerning image composition while viewing the UI screen 100.

7. UI CONTROL EXAMPLE ACCORDING TO SECOND EMBODIMENT

A second embodiment in which an AI support mode is applied to setting of a fixed region will be explained.

An AI support mode is a mode that supports a user designating a fixed region. Under the AI support mode, fixed region candidates are presented, and the degree of suitability as the fixed region is presented.

When the user performs an operation of checking a check box in an AI support mode display section 49 on the UI screen 100, the AI support mode is enabled.

Under the AI support mode, a degree of suitability for composition is determined by AI processing according to the composition mode, for example, the addition averaging mode, the lightening mode, or the weighting mode, selectee by the composition mode setting section 61, and a fixed region candidate and the degree of fixed region suitability are presented. The degree of suitability is an evaluation value that indicates how favorable a composite image obtained when the corresponding region is determined as a fixed region is, for example.

One of criteria for evaluating the degree of suitability is how small the image deviation in the composition range is when the fixed region is set.

In addition, in reference to leaning data concerning a desirable composite image and an undesirable composite image, the degree of suitability may be obtained by determining whether or not a desirable image can be obtained according to the content of the image (subject type), the composition range, and the composition mode. For example, whether a generally favorable composite image can be obtained is one evaluation criterion.

Figure 13:
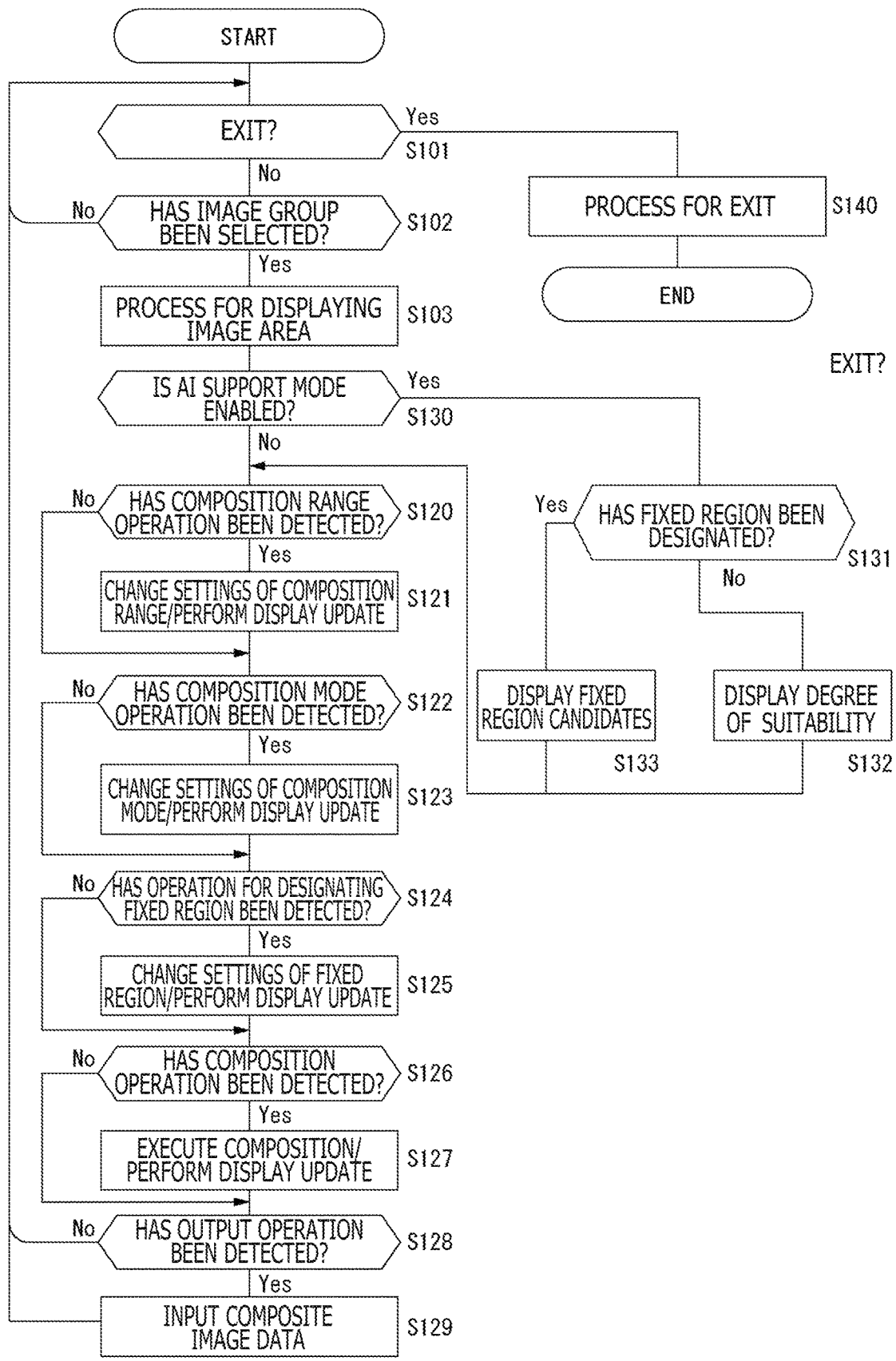
FIG. 13 is a flowchart of a UI control process according to a second embodiment.

FIG. 13 depicts an example of processing that is performed by the UI control section 30. This example is obtained by adding steps S130 to S133 to the processes in FIG. 12. The remaining processes are identical to those in FIG. 12, and thus, an explanation thereof will be omitted.

In a case where the AI support mode is enabled, the UI control section 30 advances from step S130 to step S131 where the processing is branched according to whether or not a fixed region has been designated.

In a case where a fixed region has been designated, the UI control section 30 advances to step S132 to calculate the degree of suitability of the fixed region and performs display for presenting the degree of suitability. That is, the UI control section 30 calculates a value that represents the degree to which a composite image that is obtained in a case where the composition process of composing the images included in the current composition range of the top image 50 to the last image 60 is performed while the images are adjusted with respect to the designated fixed region under the currently selected composition mode becomes a desirable image. Then, the UI control section 30 performs display corresponding to the degree of suitability, or, for example, displays a numerical value, and controls the display form corresponding to the degree of suitability.

In a case where a fixed region has not been designated, the UI control section 30 advances from step S131 to step S133 to search for a fixed region candidate in the top image 50 and the last image 60. Then, the UI control section 30 displays the fixed region candidate, and performs display control to present the degree of suitability when the fixed region candidate is determined as a fixed region.

For example, the UI control section 30 performs objection recognition in the top image 50 and the last image 60 by semantic segmentation or the like. Then, the degree of suitability of each recognized object is obtained in the abovementioned manner on the presumption that the composition process is performed on the current composition range under the current composition mode while the object is determined as a fixed region. Further, a subject region for which the degree of suitability equal to or greater than a threshold is obtained is determined as a fixed region candidate.

After selecting fixed region candidates in such a manner, the UI control section 30 presents the candidate regions on the top image 50 or the last image 60, and also, performs display corresponding to the degrees of suitability thereof.

The abovementioned AI support mode process allows the user to designate a fixed region while checking fixed region candidates.

Moreover, after the fixed region is designated, a command to execute image composition is given or the fixed region is designated again, according to the degree of suitability of the fixed region.

A specific example will be given below.

Figure 14:
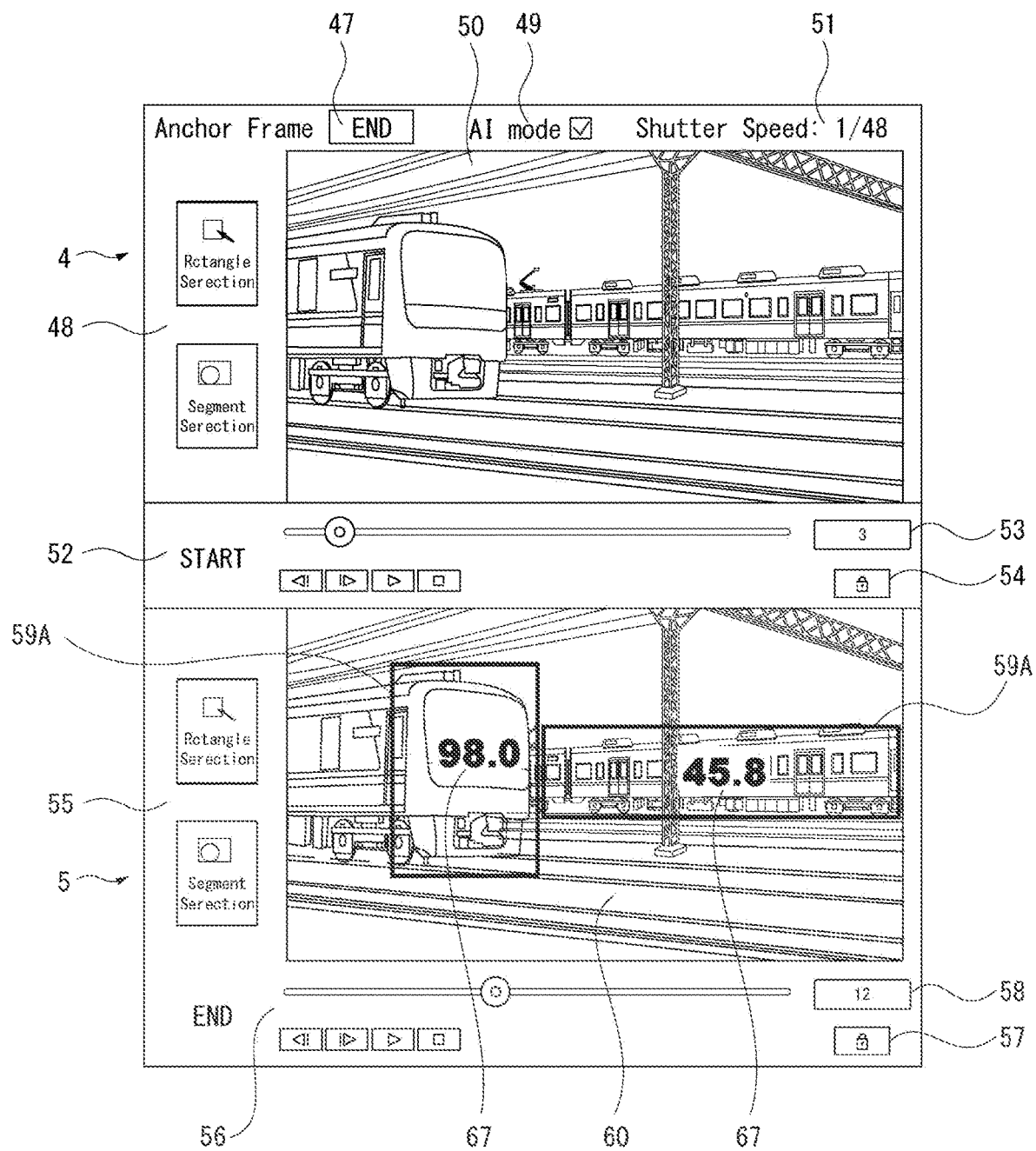
FIG. 14 is an explanatory diagram of display of fixed region candidates and the degrees of suitability thereof according to the second embodiment.

FIG. 14 depicts an example in which fixed region candidates are presented before a fixed region is designated.

For example, when fixed region candidates are found in the last image 60, the UI control section 30 presents the regions determined as fixed region candidates to a user by indicating candidate frames 59A, as depicted in FIG. 14. In this case, two candidate frames 59A indicate two regions determined as the candidates.

Further, as suitability display 67, numerical values are also displayed. Accordingly, the user can understand that the front-side train is more suitable as a fixed region.

It is to be noted that the candidate frames 59A are displayed on the last image 60 in this example, but the candidate frames 59A may be displayed on the top image 50. Also, the candidate frames 59A may be displayed on both the top image 50 and the last image 60 in some cases. The regions of different subjects may be determined as candidates. The regions of the same subject on the top image 50 and the last image 60 may be displayed because the degree of suitability of the subject designated on the top image 50 is not always identical to that of the subject designated on the last image 60. For example, in a case where the front surface of the front-side train depicted in FIG. 14 is determined as a fixed region, this fixed region that is designated on the last image 60 (that is, the fixed region that is fixed in an in-frame position on the last image 60) may provide a more desirable composite image.

Figure 15:
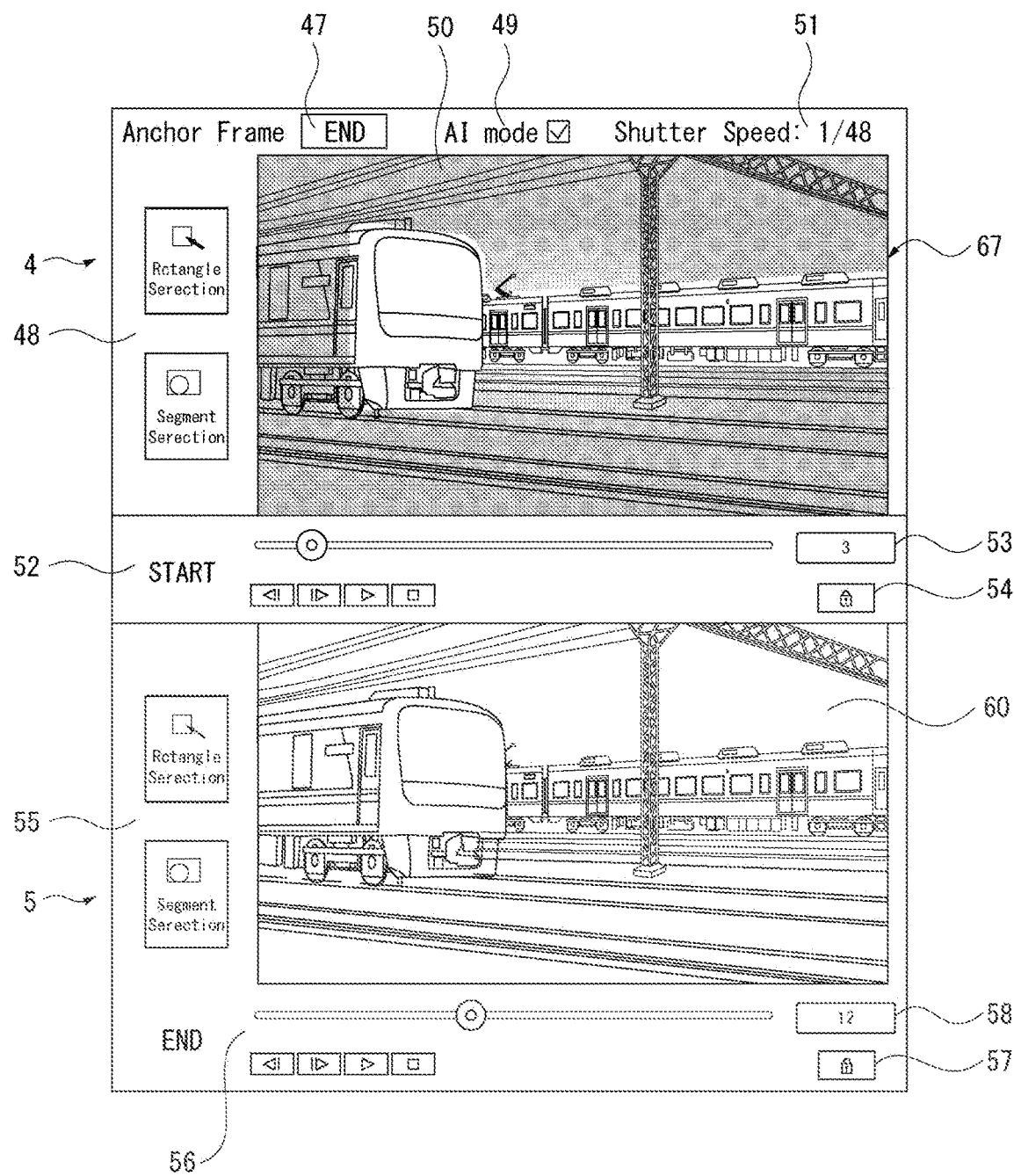
FIG. 15 is an explanatory diagram of display of the degree of suitability according to the second embodiment.

FIG. 15 depicts an example of displaying a degree of suitability. In this case, an example in which no numerical value is used as the suitability display 67 and images having different tones are overlaid is depicted, for example.

For example, the degree of suitability is calculated for each subject region, and is converted to brightness gradation. Then, the brightness gradation is superimposed.

In the top image 50 in FIG. 15, the brightness of a front part of the front-side train is high while the brightness of the region of the rear-side train is relatively low. Further, the remaining part is darker.

In such a manner, the user can intuitively recognize the degree of suitability of each subject part in the image. In addition, the degrees of suitability are indicated in the entire image. Thus, this image is suitable also in a case where a desired region that is not limited to subjects detected by object recognition is determined as a fixed region.

It is to be noted that, in the example in FIG. 15, since the degrees of suitability are indicated on the entire image, display of the candidate frame 59A is not required.

FIGS. 14 and 15 each depict an example of display control that is performed by the UI control section 30 in step S133 in FIG. 13.

Figure 16:
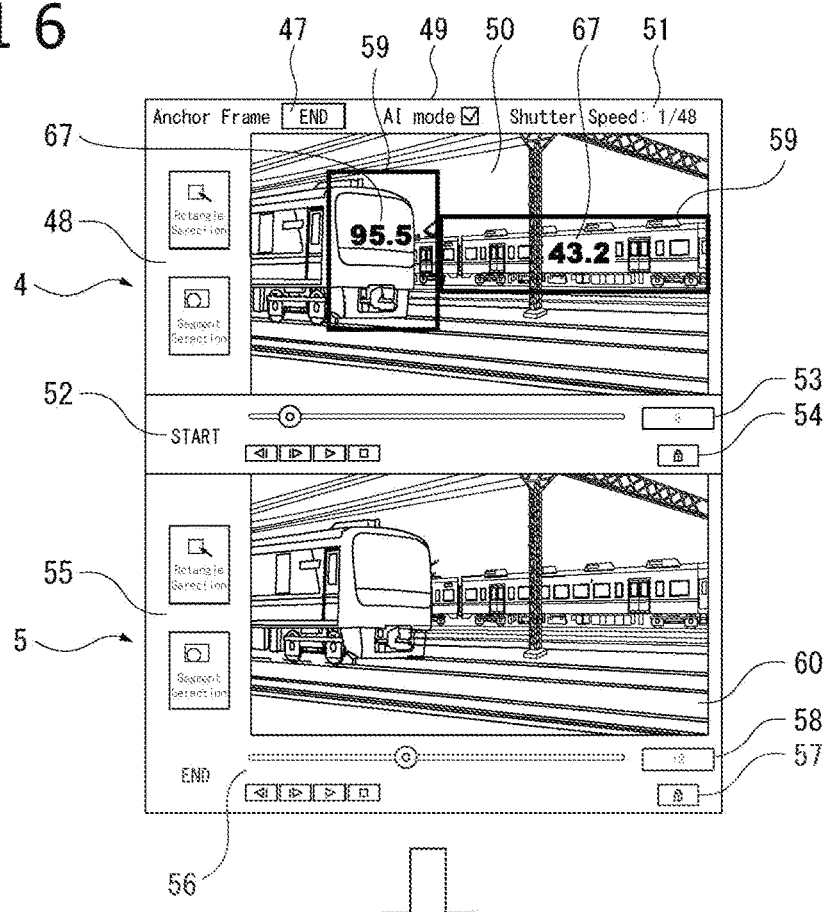
FIG. 16 depicts explanatory diagrams of changing a composition range by designating a fixed region according to the second embodiment.
Figure 16:
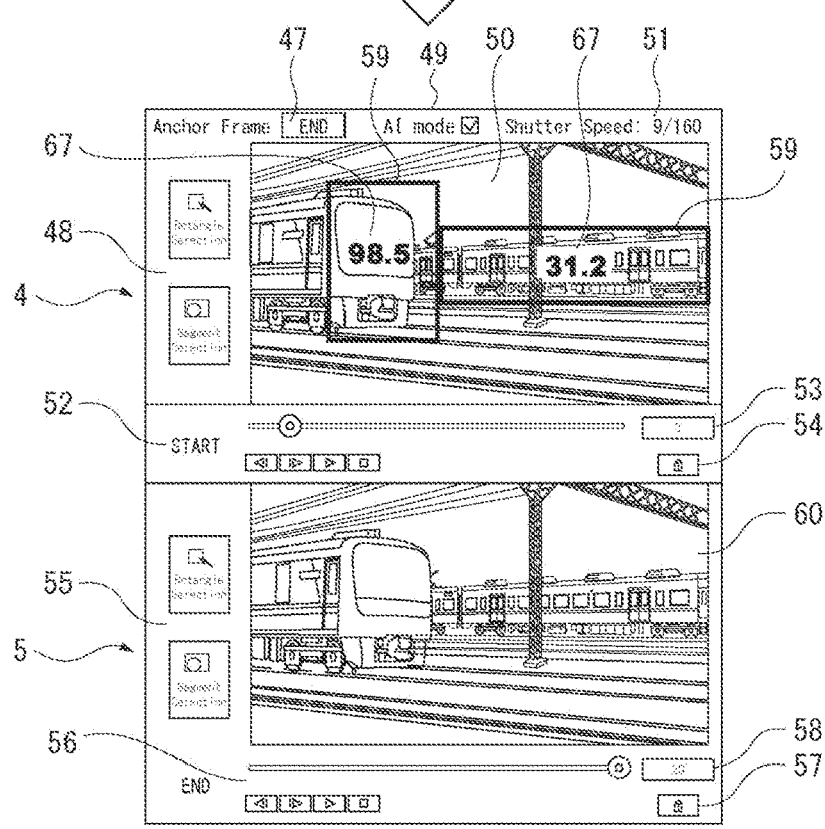

In an example of the display control that is performed in step S132 after a fixed region is designated, the fixed region frame 59 and the suitability display 67 are provided, as depicted in FIG. 16A. In this example, two fixed region frames 59 indicate two fixed regions, and further, numerical values are provided as the corresponding suitability display 67.

The suitability display 67 of the designated fixed regions is changed each time the composition range is changed, or the composition mode is changed.

For example, it is assumed that the user changes designation of the last image 60 in FIG. 16A to the last image 60 depicted in FIG. 16B. In FIG. 16A, the frame number display section 58 indicates "12." In FIG. 16B, the frame number display section 58 indicates "29" because the user has changed the last image 60 to an image captured at a later time point. In addition, since the composition range in FIG. 16B is wider, the shutter speed display section 51 is updated from "1/48" in FIG. 16A to "9/160" in FIG. 16B.

Thus, in a case where the user performs an operation of changing the composition range, the degree of suitability of the fixed region is also calculated again. This changes the numerical value of the suitability display 67, as depicted in the drawings.

In the processes of FIG. 13, step S132 or step S133 is constantly performed when the AI support mode is enabled. Thus, after the user designates a fixed region, the UI control section 30 re-calculates the degree of suitability and updates the display in step S132 each time the composition range or the composition mode is changed.

As explained so far, fixed region candidates are presented with the candidate frames 59A, and the suitability display 67 of the candidate regions or fixed regions is provided, in the AI support mode process. In particular, in a case where the user captures images while moving the image capturing device 1 to follow a subject, or conducts what is generally called panning, it is important to select a fixed region because the image capturing directions of the images included in the composition range are varied. Hence, it is useful to use the AI support mode to support designating a fixed region.

It is to be noted that, in a case where an image group to be subjected to the composition process is obtained by panning, the AI support mode may be automatically started.

For example, in a case where image analysis of an image group reveals that the in-frame position of a specific subject has gradually moved, the UI control section 30 may determine that panning is performed, and start the AI support mode.

In addition, if panning information is included in metadata added to the image data, the UI control section 30 determines, from the metadata, that the image group is obtained by panning. For example, the image capturing device 1 determines panning from an IMU detection value while capturing images, and information concerning the panning may be added to metadata. Alternatively, when performing panning, the user may perform a predetermined operation to add information concerning panning to the metadata.

Further, if IMU data concerning each image (frame) is recorded in the metadata, the UI control section 30 can determine whether or not the image group is obtained by panning, by analyzing the IMU data during the composition process.

It is to be noted that, even if panning is not performed, a shake correction effect on a region designated as a fixed region is also obtained. For this reason, it is effective to perform the AI support mode even when panning is not performed.

8. EXAMPLES OF COMPOSITION MODE

In the explanation given so far, the addition averaging mode, the lightening mode, and the weighting mode have been described as examples of the composition mode. In the addition averaging mode, pixel values in respective images are averaged. Hereinafter, an explanation of the lightening mode and the weighting mode will be given.

The lightening mode is a mode in which only a pixel value that is equal to or higher than a predetermined brightness value is determined valid and is used. The lightening mode is regarded as a composition mode for highlighting a moving bright subject.

In a case where, for example, a night scene, a starry sky, or a firework is captured and a subject has a temporarily brightening part with respect to a dark background, the temporarily brightening part becomes dark in a composite image when composition is performed in the addition average mode. The brightness value of the corresponding pixel is reduced as a result of averaging, because the temporarily brightening part is dark in other images.

Images depicted in FIG. 17 will be discussed. These images are a group of imaged obtained by continuously imaging a scene where each person holds a light emitting object such as a light or a sparkler, and moves the light emitting object so as to draw a character.

Figure 17:
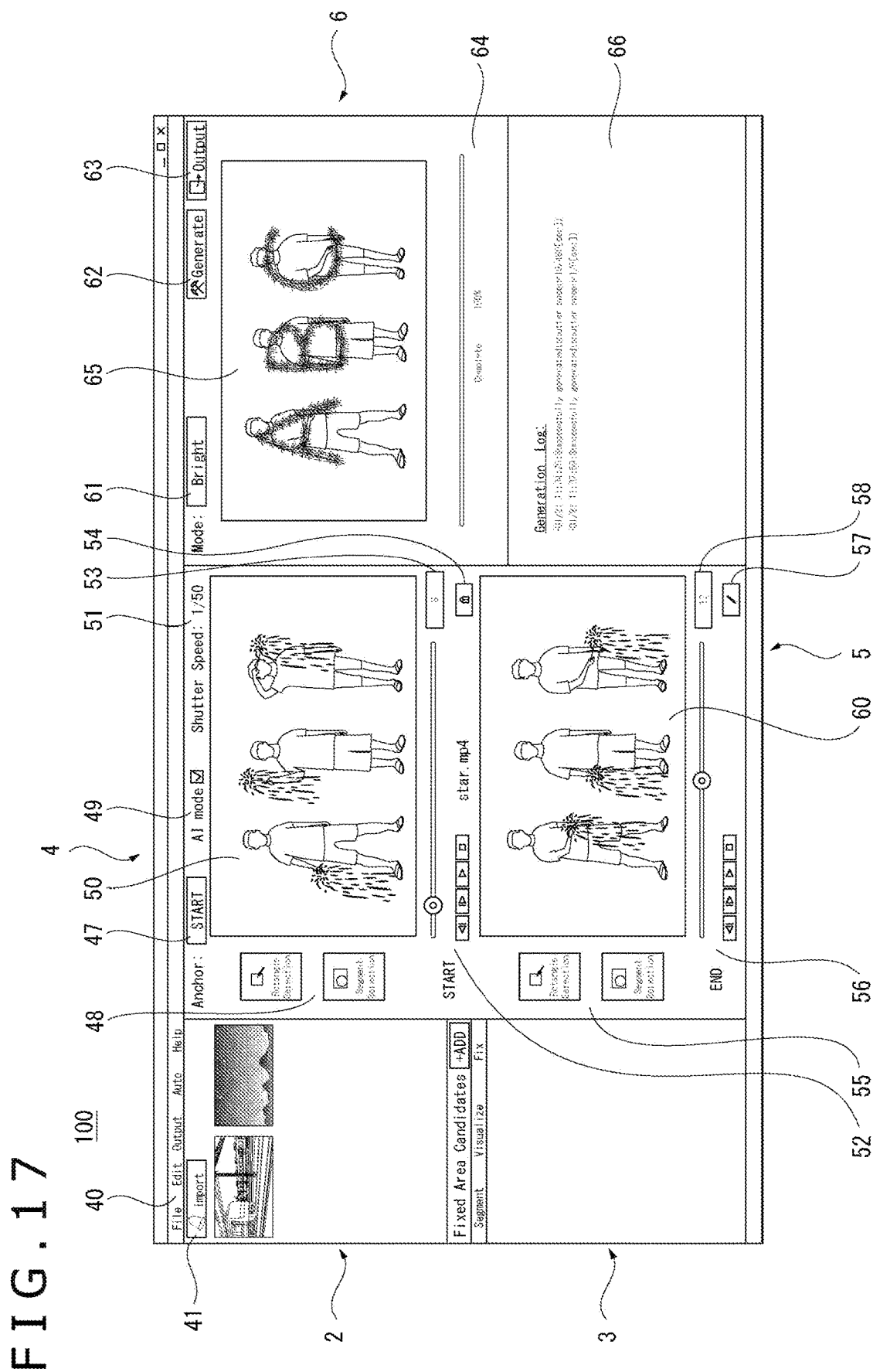
FIG. 17 is an explanatory diagram of an example of a composition mode according to the embodiments.

These images are depicted as the top image 50 and the last image 60 in FIG. 17. Each of bright parts of the light emitting objects respectively held by the persons is only one portion of each image, but, when the continuously taken images are composed, the composite image 65 in which characters by rays of light are drawn is generated.

Regarding such image composition, characters written by rays of light with high brightness can appear be composition performed in the lightening mode, but the brightness of the character parts written by rays of light becomes low in the addition averaging mode.

That is, a desirable image can be generated as an image in which the shutter speed has been changed.

Further, the content and the mood of the composite image 65 greatly depend on the composition range used for composing such kind of image group. Thus, it is useful for the user to freely set, on the UI screen 100, the composition range for the composition process under the lightening mode because the user can thereby generate an image according to the user's preferences.

Next, the weighting mode will be explained.

The weighting mode is a mode intended to compose pieces of image data within the composition range while changing the weight of each image data. In addition, the weight in a specific in-frame region in each image data may be changed.

First, an example of changing the weight of each image data included within the composition range will be explained.

The weight of the top image 50 or the last image 60 is increased, so that a front curtain synchronization or rear curtain synchronization effect can be obtained in the composite image 65.

The weight of any frame designated by a user or the weights of two or more frames may be increased. Accordingly, the composite image 65 in which a specific frame image is highlighted can be obtained.

In addition, the weight of a frame in the composition range can be set to zero. For example, in a case where there is only one frame that is not desired to be added to a composite image, a composite image can be generated by excluding the image of the frame.

In order to achieve the abovementioned weighting, numerical values for respective weights of images (frames) can be specified on the UI screen 100. For example, the initial values of all the frames are set to "1.0." The user can change the initial values to a value ranging from "0.0" to "65535.0."

In addition, a frame that is not used for composition, that is, a frame having a weight=0.0, may be specified, or a frame that is to be highlighted (the weight of which is to be increased) may be specified.

The weight may be changed in an image frame.

For example, in a case where an unnecessary subject is included in an image, the weight of the region of the subject may be reduced to zero, so that the composite image 65 from which the subject has been eliminated can be obtained. On the other hand, the weight of the region of a subject to be highlighted may be increased.

In order to make a weight change in an image frame, a user interface through which a region can be specified and the weight thereof can be set on the UI screen 100, as in the abovementioned manner of designating a fixed region, is provided.

For example, a region may be specified with a rectangular frame, a region may be specified by freehand, or multiple points may be specified to designate a region including the points. Alternatively, a region obtained by object recognition in a semantic segmentation process may be presented such that the user can specify the region and change the weight thereof.

9. CONCLUSION AND MODIFICATIONS

Effects that are provided by the abovementioned embodiments are as follows.

The control device according to the embodiment includes the UI control section 30. For example, the image capturing device 1, the camera control section 18, the information processing device 70, or the CPU 71 corresponds to the control device including the UI control section 30.

Further, the UI control section 30 performs control to simultaneously display images of some image data that is included in an image group including multiple pieces of time sequential image data and that include the top image 50 and the last image 60 which are at the top and the last in terms of time in a composition range to be subjected to a composition process.

In a case where a composition process of multiple time sequential frames of RAW images is performed, at least the top image 50 and the last image 60 in the composition time range are displayed simultaneously, so that the user can check the two images that are at the composition start and the composition end. Thus, the composition time range is easily recognized. Accordingly, an operation of setting the composition range can easily be performed.

In addition, since not all the images included in the composition range are displayed, the sizes of images displayed on one screen do not become excessively small. A UI screen that is easily visible to the user can be provided.

The UI control section 30 according to the embodiment performs control to display the top image 50 and the last image 60 side by side in one screen without involving screen transition. For example, as previously explained with reference to FIGS. 9 and 10, the top image 50 and the last image 60 can be simultaneously displayed to be compared with each other without involving screen scrolling, for example.

Accordingly, the user can compare the top image 50 and the last image 60 without particularly performing any operation of scrolling the screen or moving the displayed range. That is, the UI screen on which the user can easily recognize the composition range at a glance, and further, change the composition range while checking the composition range can be provided.

In one of the abovementioned examples, the UI control section 30 according to the embodiment controls the display of a shutter speed for a composite image that is obtained as a result of a composition process of multiple images included in the composition range of the top image 50 to the last image 60. The display is provided in the shutter speed display section 51.

Accordingly, the user can recognize the shutter speed for the composite image. This further provides an index for setting a composition range to the user who desires to generate a composite image with a lowered shutter speed.

The UI control section 30 according to the embodiment is configured to perform control to change settings of the top image 50 or the last image 60 according to an operation of changing the top image 50 or the last image 60.

Accordingly, the user can perform an operation of freely designating the top image 50 and the last image 60 in an image group. As a result, the user can generate a composite image of a desired shutter speed.

The UI control section 30 according to the embodiment is configured to indicate a time axis for an image group, and regard an operation for the indication of the time axis as an operation of changing the top image or the last image. For example, a slide bar that indicates the time axis for the image group has been explained.

By operating the slide bars of the bar/reproduction operation element display sections 52 and 56, the user can select the top image 50 and the last image 60. In this case, a composition range can be intuitively selected from the image group.

The UI control section 30 according to the embodiment is configured to change an image to be displayed as the top image 50 or the last image 60, according to an operation.

Accordingly, by performing a reproduction operation, a stop operation, a frame-by-frame advance operation, or a frame-by-frame return operation using the operation elements of the bar/reproduction operation element display sections 52 and 56, the user can select the top image 50 and the last image 60 while switching an image to be displayed as the top image or the last image. That is, the user can designate the top image 50 and the last image 60 while checking the images. Accordingly, the UI screen 100 is suitable to set the top image 50 and the last image 60 according to the intension of the user.

As previously explained, the UI control section 30 according to the embodiment determines the top image 50 or the last image 60 according to an input operation of specifying the shutter speed.

For example, the user can input any shutter speed value in the shutter speed display section 51. The UI control section 30 calculates the composition range that achieves the inputted shutter speed with respect to the top image 50, for example, and sets, as the last image 60, an image at the last of the composition range. Alternatively, the UI control section 30 calculates the composition range that achieves the inputted shutter speed with respect to the last image 60, and sets, as the top image 50, an image at the top of the composite range. Accordingly, an edit function that is useful for the user who desires to obtain a composite image having a desired shutter speed can be provided.

It is to be noted that which of the top image 50 or the last image 60 is used as a reference image may be fixed in advance, or the image in which a fixed region is determined by the fixed region frame 59 may be used as the reference image. Further, an image other than the top image 50 or the last image 60 may be used as the reference image.

The UI control section 30 according to the embodiment is configured to perform control to display, on the top image 50 or the last image 60, a fixed region for fixing an in-frame position in images during the composition process. For example, the fixed region is indicated with the fixed region frame 59.

The in-frame region (pixel position) of a fixed region is fixed throughout frames of images to be composed. Thus, in a composite image, a subject in the fixed region is clear without any blur. That is, a composite image in which a specific subject is clearly represented can be obtained.

In this case, when the fixed region is indicated on the UI screen 100, the user can recognize which subject becomes clear in the image.

The UI control section 30 according to the embodiment is configured to perform a process of setting a fixed region in a frame of the top image 50 or the last image 60 according to a fixed region designation operation.

Accordingly, the user can designate, as the fixed region, any region or subject in the top image 50 or the last image 60. Thus, the composition process which is image editing desired by the user can be performed.

In particular, a fixed region is intended to adjust the position of the subject throughout the images included in the composition range. Thus, image expression, such as panning, that requires skill can easily be achieved. Moreover, when a fixed region is set, an effect for correcting a subject shake is also provided.

In one of the abovementioned examples, the UI control section 30 according to the embodiment performs control to display, on the displayed top image 50 or last image 60, a fixed region candidate with the candidate frame 59A or the like, and performs a process of setting a fixed region in the frame of the top image 50 or the last image 60 according to a fixed region candidate designation operation.

The presented fixed region candidate serves as a guide for the user performing an operation of designating a fixed region, and also, facilitates the operation of designating a fixed region.

In addition, since a fixed region can be designated in either the top image 50 or the last image 60, a composite image that is closer to an ideal final image can be generated.

In one of the abovementioned examples, the UI control section 30 according to the embodiment performs control to display, on the displayed top image 50 or last image 60, a fixed region or a fixed region candidate with the fixed region frame 59 or the candidate frame 59A, for example, and performs control to provide the suitability display 67 which indicates a degree of suitability as a fixed region.

When a fixed region or a fixed region candidate is displayed in such a manner that its degree of suitability can be recognized, the user can determine whether or not the current setting is suitable for the composition process, or whether or not a better setting can be performed. Thus, display of the degree of suitability effectively assists a UI screen operation for performing settings of the composition process.

The UI control section 30 according to the embodiment is configured to perform user interface control to allow selection of a composition process method, and to setting of a composition process method according to an operation of selecting the composition process method. For example, the composition mode is selectable from among the addition averaging mode, the lightening mode, and the weighting mode.

Since any composition mode can be selected, the user can edit a composite image with high degree of freedom. In addition, since a composition mode is set on the user interface screen, composition editing having high degree of freedom is provided.

It is to be noted that the types of the composition mode are not limited to the above three, and a mode for performing any other composition process method may be adopted.

In one of the abovementioned examples, the UI control section 30 according to the embodiment performs control to display the composite image 65 simultaneously with the top image 50 and the last image 60 (see FIGS. 9 and 10).

Accordingly, the user can also check the composite image 65 which is generated by the composition process for the composition range defined by the top image 50 and the last image 60. Thus, while a composition result is checked on the UI screen 100, an operation of setting the stop image 50 and the last image 60 or an operation of setting a fixed region can be performed. This is useful.

In addition, when the composite image 65 in which the development process has been reflected is further displayed, editing for image composition can be performed while the final image is checked.

In one of the abovementioned examples, the UI control section 30 according to the embodiment performs control to display an operation element for giving a command for the composition process, simultaneously with the top image 50 and the last image 60.

Specifically, the composition execution button 62 is provided on the UI screen 100. Accordingly, the user can give a command to execute the composition process through the user interface screen on which the top image 50 and the last image 60 can be compared with each other. This is very useful.

In one of the abovementioned examples given in the embodiment, pieces of image data included in an image group are pieces of image data whose exposure periods at the image capturing time are continuous (see FIGS. 7 and 8).

For example, when the exposure periods of multiple pieces of RAW image data are not interrupted and are continuous, the composite RAW image data is image data that can be treated as an image that is captured at a shutter speed lower than the shutter speed used at the image capturing time. That is, the shutter speed can be edited in an essential sense of whether a continuous exposure period is long or short.

Accordingly, a shutter speed change, which is normally impossible after image capturing, can be made after image capturing.

It is to be noted that the example in which multiple pieces of RAW image data to be composed by the composition processing section 31 have the continuous exposure period as a result of the addition process of adding an exposure amount corresponding to the non-exposure period of the image sensor 12a to the exposure amount in the exposure period of the image sensor 12a being performed has been explained (see FIG. 7). Accordingly, the multiple pieces of RAW image data can be regarded as pieces of data that are obtained when any non-exposure period such as a reading period or an electric charge reset period is not provided, even if such a non-exposure period is actually provided. Thus, the composition process in which these pieces of RAW image data are regarded as multiple pieces of RAW image data that have a continuous exposure period can be performed.

In addition, the example in which multiple pieces of RAW image data to be composed by the composition processing section 31 are considered to have continuous exposure periods as a result of the pieces of RAW image data being read out by the multiple image sensors 12a1 and 12a2 alternately has been explained (see FIG. 8). The multiple image sensors 12a1 and 12a2 are used, the exposure timings of the image sensors 12a1 and 12a2 are set such that one of the image sensors performs exposure during a non-exposure period of the other image sensor, and pieces of RAW image data read by the image sensors 12a1 and 12a2 alternately are obtained. Accordingly, these pieces of RAW image data are multiple pieces of RAW image data the exposure periods of which are continuous.

In one of the abovementioned examples in the embodiment, pieces of image data constituting the image group to be composed are RAW image data.

In a case where the composition process of composing multiple pieces of image data is performed on RAW image data, the multiple pieces of image data that have not been developed are composed, and then, a development process is performed. Further, in a case where the development process of the composite PAW image data is performed to generate JPEG image data or the like, a suitable development process can be performed on the compose RAW image data.

The multiple pieces of RAW image data to be composed may be obtained as time sequential still images, or may be RAW image data of frames of a video. Moreover, the multiple pieces of PAW image data to be composed do not need to have relevance concerning image capturing times, or have relevance concerning a subject, and may be irrelevant to each other. That is, multiple pieces of RAW image data optionally selected by the user may be composed.

In addition, when the pieces of RAW image data are composed, and then, the composite RAW image data is developed, a development process can be performed with use of various parameters suitable for the composite RAW image data. For example, composite image data of a predetermined format such as JPEG image data can be obtained. Accordingly, the image quality of the generated composite image (e.g., an image based on JPEG image data) can be increased.

In addition, since it is not necessary to perform the development process on each piece of the RAW image data that has not yet undergone the composition process, the efficiency of the development process can be increased.

In addition, composite RAW image data is obtained by composing pieces of RAW image data that have not yet undergone a development process including compression or the like, and much information in the original images is still included. Thus, such an advantage that the degree of freedom of the user performing image processing is increased is provided.

In addition, since the composite RAW image data is saved, it is suitable to perform a development process in the future when the development technology has advanced.

It is to be noted that the example in which RAW image data is image data that has an array of colors identical to that of an image capturing element has been described. For example, image data of an R, G, and B format has been explained. The image data includes image data including pixel values of G1, G2, R, and B pixels of a Bayer array, or image data obtained by performing some of the abovementioned processes on the pixel values. The RAW image data having these pixel values is original image information read out from the image capturing element section 12. The degree of freedom is also high when the development process following the image composition is performed on this RAW image data.

In addition, YC-RAW image data which is obtained by converting pixel values read out from an image capturing element to a format of brightness values and chroma values and that has not undergone color reproduction/sharpness processing has been described as an example of RAW image data. Regarding YC-RAW image data, the efficiency of a development process thereof is increased if the YC-RAW image data undergoes the composition process. In addition, since the YC-RAW image data can be restored to RAW image data, the composition process and the following development process can be performed on the RAW image data restored from the YC-RAW image data.

In the embodiment, an example in which the pieces of image data included in the image group are pieces of time sequential image data that are obtained by continuous capturing of still images or video capturing has been explained.

With regard to shutter speed editing, the image group obtained by continuous capturing of still images or video capturing is preferable because multiple pieces of image data included in the composition range are pieces of time sequential data. In addition, the UI screen according to the embodiment can preferably be used for a composition process in which an image group obtained by normal continuous image capturing or normal video capturing is used as a material.

As previously explained, the control device according to an embodiment (e.g., the image capturing device 1, the information processing device 70) may further include the composition processing section 31 that composes multiple images included in the composition range of the top image 50 to the last image 60 determined by the UI control section 30. In addition, the camera control section 18 and the CPU 71 may include the composition processing section 31 in addition to the UI control section 30, as previously explained.

Accordingly, by composing multiple pieces of image data, composite image data the shutter speed of which is changed to be lower than the shutter speed used at the image capturing time of each image data can be obtained. For example, in one of the abovementioned examples of the embodiment, multiple pieces of PAW image data to be composed by the composition processing section 31 are obtained as time sequential frames. Accordingly, after the image capturing, an image can be obtained as if the image had been taken at a shutter speed lower than the shutter speed used at the capturing time, for example. That is, the shutter speed can be edited after image capturing is performed.

In addition, a failure caused by a mistake in shutter speed setting, which may be made at a rare photo opportunity, for example, can be avoided.

In addition, it does not take much time to adjust a shutter speed, and thus, a photo opportunity is not missed.

In addition, since the shutter speed at the image capturing time is not changed, light quantity control is not required, but a composite image for which any shutter speed is set can be generated from images that have been captured with appropriate light quantities.

Moreover, a new image expression can be achieved when the shutter speed is adjusted with high precision after image capturing. In addition, a development process can be performed on composite RAW image data having undergone the shutter speed editing.

The program according to the embodiment causes a CPU, a DSP, a GPU, a GPGPU, an AI processor, or a device including them to execute the processes in FIGS. 12 and 13 described above.

That is, the program according to the embodiment causes a computation processing device to perform UI control to display some images that are included in an image group including multiple pieces of time sequential image data and that include the top image 50 and the last image 60 that are at the top and the end in terms of time in a composition range to be subjected to a composition process.

With such a program, a control device according to the present disclosure can be implemented by any type of a computer device.

The program can be recorded in advance in an HDD as a recording medium included in a computer device or the like, or in a ROM of a CPU-provided microcomputer, for example. Alternatively, the program may be temporarily or permanently stored (recorded) in a removable recording medium such as a flexible disk, a CD-ROM (Compact Disc Read Only Memory), an MO (Magneto Optical) disk, a DVD (Digital Versatile Disc), a Blu-ray disc (registered trademark), a magnetic disk, a semiconductor memory, or a memory card. Such a removable recording medium can be provided as what is generally called package software.

In addition, such a program can be installed from a removable recording medium to a personal computer, or can be downloaded from a download site via a network such as a LAN (Local Area Network) or the internet.

In addition, with such a program, the control device according to the present disclosure can be preferably applied to a wide range of purposes. For example, when the program is downloaded into a mobile terminal device such as a smartphone or a tablet, a mobile telephone device, a personal computer, a game device, a video device, a PDA (Personal Digital Assistant), or the like, the device can function as a control device according to the present disclosure.

It is to be noted that the effects described in the present description are merely examples, and thus, are not restrictive. In addition, any other effect may be provided.

It is to be noted that the present technology can also take the following configurations.

(1)
A control device including:
a user interface control section that performs control to simultaneously display some images that are included in an image group including multiple pieces of time sequential image data and that include a top image and a last image, the top image and the last image being at the top and the end in terms of time in a composition range to be subjected to a composition process.

(2)
The control device according to (1) above, in which
the user interface control section performs control to display the top image and the last image side by side in one screen without involving screen transition.

(3)
The control device according to (1) or (2) above, in which
the user interface control section performs control to display a shutter speed for a composite image that is obtained by the composition process of multiple images included in the composition range of the top image to the last image.

(4)
The control device according to any one of (1) through (3) above, in which
the user interface control section changes setting of the top image or the last image according to an operation of changing the top image or the last image.

(5)
The control device according to (4) above, in which
the user interface control section causes a time axis for the image group to be indicated, and further, regards an operation performed on the indicated time axis, as an operation of changing the top image or the last image.

(6)
The control device according to (4) or (5) above, in which
the user interface control section changes an image to be displayed as the top image or the last image, according to an operation.

(7)
The control device according to any one of (4) through (6) above, in which
the user interface control section sets the top image or the last image according to a shutter speed input operation.

(8)
The control device according to any one of (1) through (7) above, in which
the user interface control section performs control to display, on the displayed top image or last image, a fixed region in which an in-frame position is to be fixed throughout the images during the composition process.

(9)
The control device according to any one of (1) through (8) above, in which
the user interface control section performs a process of setting a fixed region in a frame of the top image or the last image according to an operation of designating a fixed region in which an in-frame position is to be fixed throughout the images during the composition process.

(10)
The control device according to any one of (1) through (9) above, in which
the user interface control section performs control to display, on the displayed top image or last image, a candidate of a fixed region in which an in-frame position is to be fixed throughout the images during the composition process, and sets the fixed region in a frame of the top image or the last image according to a fixed region candidate designation operation.

(11)
The control device according to any one of (1) through (10) above, in which
the user interface control section performs control to display, on the displayed top image or last image, a fixed region candidate or a fixed region in which an in-frame position is to be fixed throughout the images during the composition process, and further, to display a degree of suitability as a fixed region.

(12)
The control device according to any one of (1) through (11) above, in which
the user interface control section performs user interface control to allow selection of a method of the composition process, and sets the method of the composition process according to a composition process method selection operation.

(13)
The control device according to any one of (1) through (12) above, in which
the user interface control section performs control to display a composite image simultaneously with the top image and the last image.

(14)

The control device according to any one of (1) through (13) above, in which
the user interface control section performs control to display an operation element for giving a command for performing the composition process, simultaneously with the top image and the last image.

(15)

The control device according to any one of (1) through (14) above, in which
pieces of image data included in the image group are pieces of image data whose exposure periods at an image capturing time are continuous.

(16)

The control device according to any one of (1) through (15) above, in which
each image data included in the image group includes RAW image data.

(17)

The control device according to any one of (1) through (16) above, in which
pieces of image data included in the image group are pieces of time sequential image data obtained by continuous capturing of still images or video capturing.

(18)

The control device according to any one of (1) through (17) above, further including:
a composition processing section that composes multiple images included in the composition range of the top image to the last image set by the user interface control section.

(19)

A control method including:
by a control device, performing user interface control to simultaneously display some images that are included in an image group including multiple pieces of time sequential image data and that include a top image and a last image, the top image and the last image being at the top and the end in terms of time in a composition range to be subjected to a composition process.

(20)

A program for causing a computation processing device to perform:
user interface control to simultaneously display some images that are included in an image group including multiple pieces of time sequential image data and that include a top image and a last image, the top image and the last image being at the top and the end in terms of time in a composition range to be subjected to a composition process.

REFERENCE SIGNS LIST

1: Image capturing device
2: Input selection area
3: Adjustment area
4: Top image area
5: Last image area
6: Composite image area
12: Image capturing element section
12a, 12a1, 12a2: Image sensor
18: Camera control section
20: Image processing section
30: UI control section
31: Composition processing section
32: Development processing section
50: Top image
51: Shutter speed display section
52, 56: Bar/reproduction operation element display section
59: Fixed region frame
59A: Candidate frame
60: Last image
61: Composition mode setting section
62: Composition execution button
65: Composite image
67: Suitability display
70: Information processing device
71: CPU
100: UI screen

The invention claimed is:

1. A control device comprising:
a memory storing a program, and
at least one processor configured to execute the program to perform operations comprising:
performing control to simultaneously display some images that are included in an image group including multiple pieces of time sequential image data and that include a top image and a last image, the top image and the last image being at the top and the end in terms of time in a composition range to be subjected to a composition process;
performing control to display, on the displayed top image or last image, a fixed region candidate or a fixed region in which an in-frame position is to be fixed throughout the images during the composition process; and
performing control to display a degree of suitability as a fixed region in association with the display of the fixed region candidate or the fixed region.

2. The control device according to claim 1, wherein the operations further comprise:
performing control to display the top image and the last image side-by-side in one screen without involving screen transition.

3. The control device according to claim 1, wherein the operations further comprise:
performing control to display a shutter speed for a composite image that is obtained by the composition process of multiple images included in the composition range of the top image to the last image.

4. The control device according to claim 1, wherein the operations further comprise:
changing a setting of the top image or the last image according to an operation of changing the top image or the last image.

5. The control device according to claim 4, wherein the operations further comprise:
causing a time axis for the image group to be indicated; and
regarding an operation performed on the indicated time axis as an operation of changing the top image or the last image.

6. The control device according to claim 4, wherein the operations further comprise:
changing an image to be displayed as the top image or the last image, according to an operation.

7. The control device according to claim 4, wherein the operations further comprise:
setting the top image or the last image according to a shutter speed input operation.

8. The control device according to claim 1, wherein the operations further comprise:

performing control to display, on the displayed top image or last image, a fixed region in which an in-frame position is to be fixed throughout the images during the composition process.

9. The control device according to claim 1, wherein the operations further comprise:
performing a process of setting a fixed region in a frame of the top image or the last image according to an operation of designating a fixed region in which an in-frame position is to be fixed throughout the images during the composition process.

10. The control device according to claim 1, wherein the operations further comprise:
performing control to display, on the displayed top image or last image, a candidate of a fixed region in which an in-frame position is to be fixed throughout the images during the composition process; and
setting the fixed region in a frame of the top image or the last image according to a fixed region candidate designation operation.

11. The control device according to claim 1, wherein the operations further comprise:
performing user interface control to allow selection of a method of the composition process, and setting the method of the composition process according to a composition process method selection operation.

12. The control device according to claim 1, wherein the operations further comprise:
performing control to display a composite image simultaneously with the top image and the last image.

13. The control device according to claim 1, wherein the operations further comprise:
performing control to display an operation element for giving a command for performing the composition process, simultaneously with the top image and the last image.

14. The control device according to claim 1, wherein pieces of image data included in the image group are pieces of image data whose exposure periods at an image capturing time are continuous.

15. The control device according to claim 1, wherein each image data included in the image group includes RAW image data.

16. The control device according to claim 1, wherein pieces of image data included in the image group are pieces of time sequential image data obtained by continuous capturing of still images or video capturing.

17. The control device according to claim 1, wherein the operations further comprise:
composing multiple images included in the composition range of the top image to the last image.

18. A control method comprising:
performing user interface control to simultaneously display some images that are included in an image group including multiple pieces of time sequential image data and that include a top image and a last image, the top image and the last image being at the top and the end in terms of time in a composition range to be subjected to a composition process;
performing control to display, on the displayed top image or last image, a fixed region candidate or a fixed region in which an in-frame position is to be fixed throughout the images during the composition process; and
performing control to display a degree of suitability as a fixed region in association with the display of the fixed region candidate or the fixed region.

19. A non-transitory computer readable medium storing a program, the program being executable by a processor to perform operations comprising:
performing control to simultaneously display some images that are included in an image group including multiple pieces of time sequential image data and that include a top image and a last image, the top image and the last image being at the top and the end in terms of time in a composition range to be subjected to a composition process;
performing control to display, on the displayed top image or last image, a fixed region candidate or a fixed region in which an in-frame position is to be fixed throughout the images during the composition process; and
performing control to display a degree of suitability as a fixed region in association with the display of the fixed region candidate or the fixed region.

* * * * *